US008826085B2

(12) United States Patent
Sugimoto

(10) Patent No.: US 8,826,085 B2
(45) Date of Patent: Sep. 2, 2014

(54) DISPLAY SCREEN CONTROL DEVICE WITH ERROR ALERT, DISPLAY SCREEN CONTROL METHOD, AND COMPUTER READABLE MEDIUM

(75) Inventor: Tetsuya Sugimoto, Mukou (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 725 days.

(21) Appl. No.: 13/051,166

(22) Filed: Mar. 18, 2011

(65) Prior Publication Data
US 2011/0239059 A1    Sep. 29, 2011

(30) Foreign Application Priority Data

Mar. 23, 2010   (JP) ................................ 2010-066264

(51) Int. Cl.
*G06F 11/00*     (2006.01)
*H04N 1/00*     (2006.01)
(52) U.S. Cl.
CPC .... *H04N 1/00464* (2013.01); *H04N 2201/0094* (2013.01); *H04N 1/00244* (2013.01); *H04N 1/00472* (2013.01); *H04N 1/00482* (2013.01)
USPC ................... 714/57; 714/43; 714/44; 714/56
(58) Field of Classification Search
CPC ... G06F 11/327; G06F 3/0481; G06F 9/4443; G06F 11/328; G06F 3/1207; G06F 11/07; G06F 11/0769; G06F 11/324
USPC ......................................... 714/43, 44, 56, 57
See application file for complete search history.

(56) References Cited

U.S. PATENT DOCUMENTS 6,915,461 B1 *   7/2005   Watanabe ........................ 714/57
7,325,045 B1 *   1/2008   Manber et al. ................ 709/219
(Continued)

FOREIGN PATENT DOCUMENTS

| JP | 10-243366 | 9/1998 |
|---|---|---|
| JP | 10-269160 A | 10/1998 |
| JP | 2007-179235 A | 7/2007 |
| JP | 2007-286723 | 11/2007 |

(Continued)

OTHER PUBLICATIONS

Office Action dated Dec. 6, 2011, issued in the Corresponding Japanese Patent Application No. 2010-066264, and an English translation thereof.

(Continued)

*Primary Examiner* — Bryce Bonzo
*Assistant Examiner* — Elmira Mehrmanesh
(74) *Attorney, Agent, or Firm* — Buchanan Ingersoll & Rooney PC

(57) ABSTRACT

A display screen control device comprises: a communicating part for performing data communication with a web server; a browser for acquiring a display screen available for the user to make the entry operation from the web server via the communicating part and displaying the acquired display screen on a display part; an error detecting part for detecting whether or not a display error of a content contained in the display screen acquired by the browser is occurred with the display screen being displayed; an error determining part for determining whether or not the content in which the display error is detected is necessary for the user to continue the entry operation when the display error is detected by the error detecting part; and an annunciation controlling part for controlling displaying or not displaying an annunciation image to alert the user to again acquire the display screen on the display part.

15 Claims, 18 Drawing Sheets

(56) References Cited

U.S. PATENT DOCUMENTS

| | | | |
|---|---|---|---|
| 7,478,330 B1* | 1/2009 | Branson et al. | 715/738 |
| 8,154,760 B2* | 4/2012 | Satoh | 358/1.4 |
| 2002/0019970 A1* | 2/2002 | Araki et al. | 716/13 |
| 2006/0235943 A1* | 10/2006 | Nakai | 709/217 |
| 2006/0290680 A1* | 12/2006 | Tanaka et al. | 345/173 |
| 2007/0147323 A1 | 6/2007 | Matsui et al. | |
| 2010/0053660 A1 | 3/2010 | Tsuboi et al. | |
| 2010/0053674 A1 | 3/2010 | Kano | |
| 2013/0332782 A1* | 12/2013 | Christena et al. | 714/57 |

FOREIGN PATENT DOCUMENTS

| | | |
|---|---|---|
| JP | 2010-039663 A | 2/2010 |
| JP | 2010-061366 | 3/2010 |

OTHER PUBLICATIONS

The extended European Search Report dated Feb. 28, 2012, issued in corresponding European Patent Application No. 11158442.1. (9 pages).

* cited by examiner

DISPLAY SCREEN CONTROL DEVICE WITH ERROR ALERT, DISPLAY SCREEN CONTROL METHOD, AND COMPUTER READABLE MEDIUM

This application is based on the application No. 2010-066264 filed in Japan, the contents of which are hereby incorporated by reference.

BACKGROUND OF THE INVENTION

1. Field of the Invention

The present invention relates to a display screen control device, a display screen control method, and a computer readable medium. The present invention more specifically relates to a technique of acquiring a display screen from a web server and displaying.

2. Description of the Background Art

Recently, image processing devices called as digital complex devices or MFPs (multi function peripherals) include a browser for browsing web pages. The browser acquires a display screen to display on an operational panel from a web server connected through a network and displays. This known technique is introduced for example in Japanese Patent Application Laid-Open No. JP2010-39663 A. According to the above-described configuration of display, the display screen acquired from the web server contains, for example, information such as an operation key operable for a user with the image processing device or a set item allowed to be set by the user and the corresponding set value as a content such as an image.

For the above-described configuration of display, when a heavy load is placed on the web server or the network, some or all of at least one content contained in the display screen is sometimes not displayed on the operational panel. In such a case, the user is not able to know what information is contained in the content not being displayed on the operational panel, and the user is not capable of continuing an operation to set. So, when the user meets a situation that at least one content is not displayed on the operational panel, he or she should make an operation to again acquire the display screen from the web server in own discretion.

A screen size capable of displaying of a display device such as the operational panel of the image processing device is small. In order to display the display screen acquired from the web server in the largest size, information such as a tool bar to give instructions to the browser is set not to display in many cases. In those cases, even when the user would like to give instructions for another acquisition of the display screen to the browser, he or she does not know what operation he or she should make. So, it is not user friendly.

It is assumed that at least one content contained in the display screen acquired from the web server by the browser is not displayed when the acquired display screen is displayed on the operational panel. In this case, the browser may again acquire the display screen from the web server automatically without receiving an instruction from the user. However, if the display error of the content is occurred then, another acquisition of the display screen is started without exception. So, even though the content does not affect continuation of the setting operation for the user is not displayed, another acquisition of the display screen is started. The operation made by the user is interrupted.

When at least one content contained in the display screen is not displayed, an error message may appear in the display screen and the user may be inquired whether or not to execute another acquisition of the display screen. The user, however, is not capable of knowing the content not being displayed contains what information. So, sometimes the user finds out the content again acquired from the web server does not affect continuation of the setting operation when the acquired content is displayed after giving instructions for another acquisition of the display screen. In such a case, the operation for the instruction to again acquire the display screen by the user ends up wasted, and it takes an extra time to display an unnecessary content. The operation by the user is interrupted.

SUMMARY OF THE INVENTION

The present invention is intended to solve the problems described above. Thus, the present invention is intended to provide a display screen control device, a display screen control method and a computer readable medium capable of enabling a user operation to be continued appropriately without causing a user to make a wasted operation when at least one content contained in a display screen acquired from a web server device is not displayed normally.

First, the present invention is directed to a display screen control device.

According to one aspect of the display screen control device, the display screen control device comprises: a display part for displaying various types of information; an operation detecting part for detecting an entry operation made by a user; a communicating part for performing data communication with a web server; a browser for acquiring a display screen available for the user to make the entry operation from the web server via the communicating part and displaying the acquired display screen on the display part; an error detecting part for detecting whether or not a display error of a content contained in the display screen acquired from the web server by the browser is occurred with the display screen being displayed on the display part; an error determining part for determining whether or not the content in which the display error is detected is necessary for the user to continue the entry operation when the display error is detected by the error detecting part; and an annunciation controlling part for controlling displaying or not displaying an annunciation image to alert the user to again acquire the display screen on the display part based on a result of the determination made by the error determining part.

Second, the present invention is directed to a display screen control method.

According to one aspect of the method, the method comprises the steps of: (a) acquiring a display screen available for a user to make an entry operation from a web server connected through a network and displaying the acquired display screen on a predetermined display part; (b) detecting whether or not a display error of a content contained in the display screen acquired from the web server is occurred with the display screen being displayed on the display part; (c) determining whether or not the content in which the display error is detected is necessary for the user to continue the entry operation when the display error is detected; and (d) controlling displaying or not displaying an annunciation image to alert the user to again acquire the display screen on the display part based on a result of the determination.

Third, the present invention is directed to a computer-readable recording medium on which a program is recorded.

According to an aspect of the computer-readable recording medium, the program recorded on the recording medium causes a computer to execute steps of: (a) acquiring a display screen available for a user to make an entry operation from a web server connected through a network and displaying the acquired display screen on a predetermined display part; (b)

detecting whether or not a display error of a content contained in the display screen acquired from the web server is occurred with the display screen being displayed on the display part; (c) determining whether or not the content in which the display error is detected is necessary for the user to continue the entry operation when the display error is detected; and (d) controlling displaying or not displaying an annunciation image to alert the user to again acquire the display screen on the display part based on a result of the determination.

DESCRIPTION OF THE PREFERRED EMBODIMENTS

Figure 1:
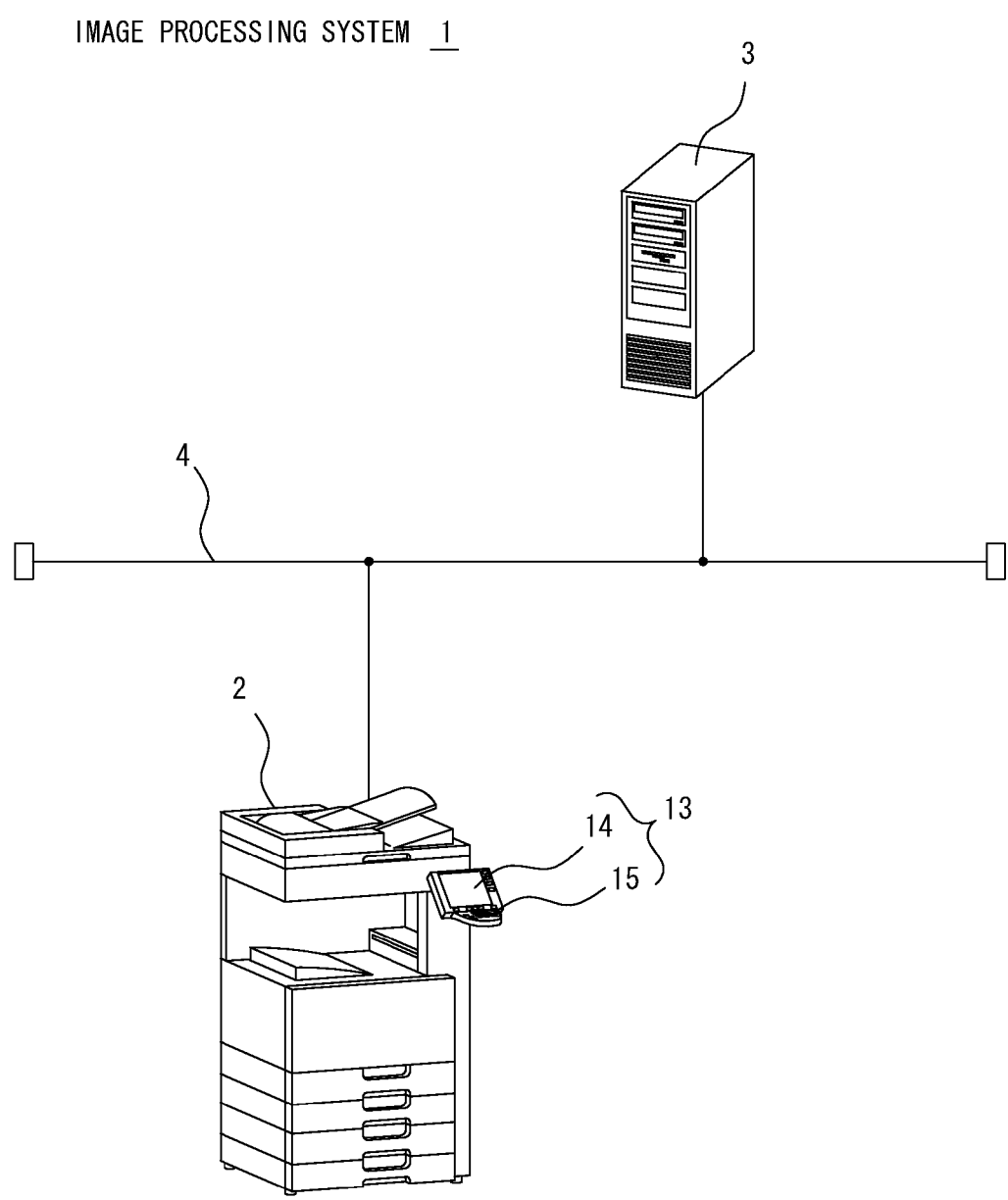
FIG. 1 shows an exemplary configuration of an image processing system.

Preferred embodiments of the present invention are described in detail below with reference to figures. In the description given below, those elements which are shared in common among the preferred embodiments are represented by the same reference numerals, and these elements are not discussed repeatedly for the same description.

First Preferred Embodiment

FIG. 1 shows an exemplary configuration of an image processing system 1 to which the present invention is applied. The image processing system 1 comprises an image processing device 2 called as a name such as a digital complex device or an MFP (multi function peripheral) and a web server device 3 connected to a network 4. The network 4 may be, for example, LAN established in an office environment or a network including an internet and others.

The image processing device 2 has several functions such as a copy function, a scanner function, a printer function and a fax function, and executes a job corresponding to the respective function. The image processing device 2, however, should not always be a device having several functions. The image processing device 2 may be a single-function device such as a copier, a scanner, a printer and a fax machine.

The image processing device 2 is provided with an operational panel 13, a user interface when operated by a user. The operational panel 13 includes a display unit 14 on which various types of information are displayed and a manipulation input unit 15 with which the user makes entries. The display unit 14 is formed from a device such as a color liquid crystal display, for instance. The manipulation input unit 15 has a plurality of operation keys including both touch panel keys arranged on a screen of the display unit 14 and push-button keys arranged around the display unit 14. The image processing device 2 acquires a display screen to be displayed on the display unit 14 from the web server 3 through the network 4 and displays the acquired display screen on the display unit 14.

The web server 3 provides a display screen displayed on the display unit 14 of the operational panel 13 to the image processing device 2 with, for example, HTTP (Hypertext Transfer Protocol). The web server 3 stores in advance therein at least one operation screen corresponding to each function of the image processing device 2. The web server 3 creates a display screen showing a current set value reflected to one of the operation screens based on a request for screen from the image processing device 2, and transmits the created display screen to the image processing device 2.

In addition to providing the display screen to the image processing device 2, the web server 3 may provide a function not included in the image processing device 2 as an application service. The application service includes variety of services. The application service may be, for example, an OCR function (Optical Character Recognition) to acquire image data generated by reading with the scanner function from the image processing device 2 and recognize a character contained in the image data. In this case, the web server 3 creates the display screen for variety of setting operations relating to the application service and transmits to the image processing device 2. The image processing device 2 displays the display screen received from the web server 3 on the display unit 14, thereby making the application service provided by the web server 3 available to the user who uses the image processing device 2.

Figure 2:
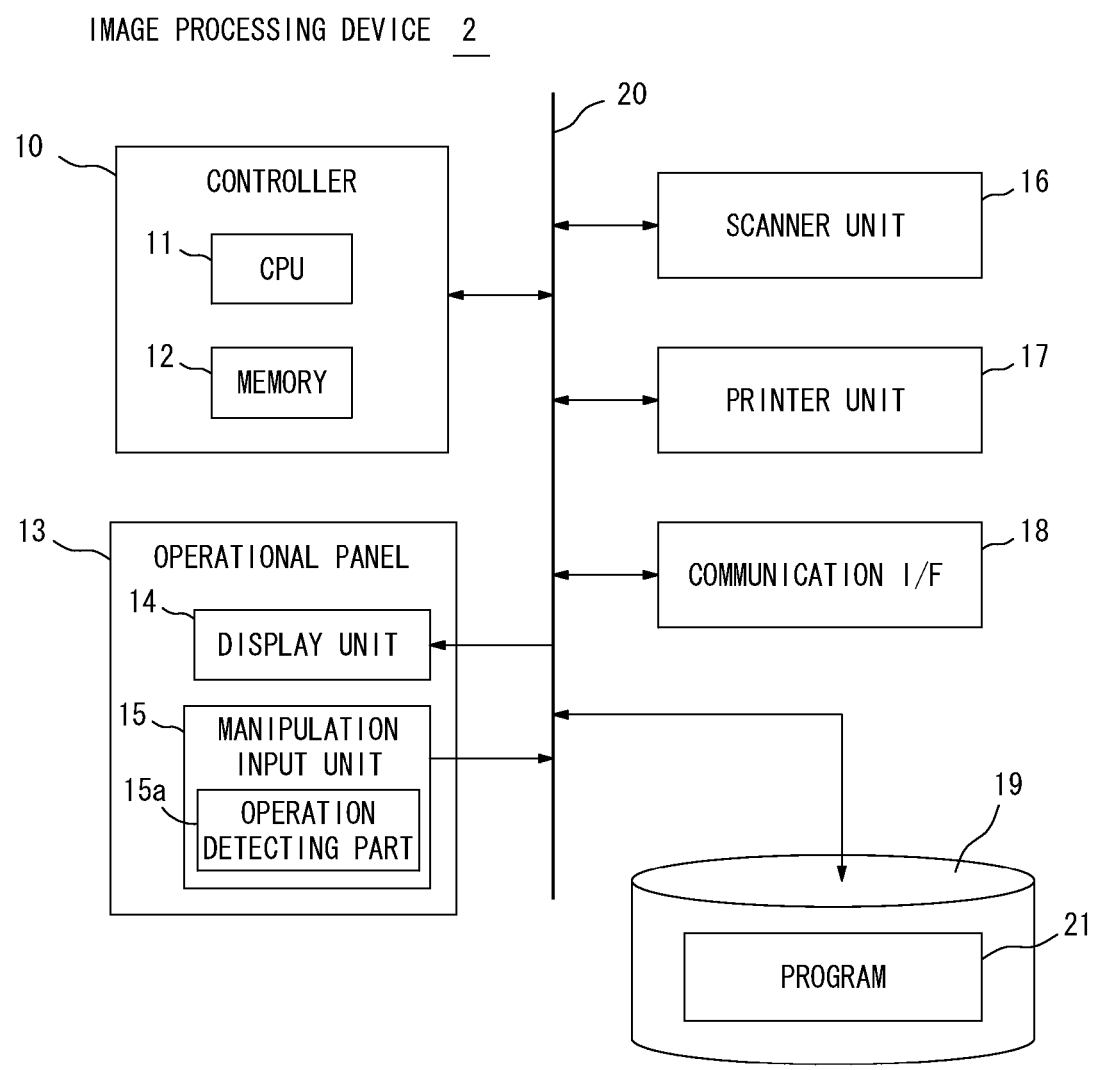
FIG. 2 is a block diagram showing the hardware configuration of an image processing device.

FIG. 2 is a block diagram showing the hardware configuration of the image processing device 2. The image processing device 2 includes a controller 10, the operation panel 13, a scanner unit 16, a printer unit 17, a communication interface 18 and a storage device 19 that are connected to each other to allow data communication between these parts through a data bus 20.

The controller 10 includes a CPU 11 and a memory 12. The controller 10 controls operations of each part, the operation panel 13, the scanner unit 16, the printer unit 17, the communication interface 18 and the storage device 19. In the first preferred embodiment, the CPU 11 reads and executes a program 21 stored in the storage device 19, thereby realizing a function as a display screen control device controls the display screen to be displayed on the display unit 14 of the operational panel 13. The memory 12 stores data therein such as temporary data when the CPU 11 executes processing based on the program 21.

The display unit 14 of the operational panel 13 displays the display screen received from the controller 10 through the data bus 20. The manipulation input unit 15 includes an operation detecting part 15a for detecting operation made by the user. As detecting the operation made by the user, the operation detecting part 15a outputs a detecting signal to the controller 10.

The scanner unit 16 operates based on instructions from the controller 10 when a job of a function such as the copy function, the scanner function and the fax transmission function is executed in the image processing device 2. To be more specific, the scanner unit 16 generates image data by reading a document and outputs.

The printer unit 17 operates based on instructions from the controller 10 when a job of a function such as the copy function, the printer function and the fax receiving function is executed in the image processing device 2. To be more specific, the printer unit 17 forms an image on a printing medium such as a printing sheet based on received image data, thereby outputting a printed matter.

The communication interface 18 is for connecting the image processing device 2 to the network 4. The controller 10 performs data communication with the web server 3 via the communication interface 18, thereby acquiring the display screen from the web server 3.

The storage device 19 is formed from a nonvolatile storage device such as a hard disk drive, for example. The storage device 19 stores therein the program 21 installed in advance. The program 21 is executed by the CPU 11 of the controller 10 as described above. The program 21 includes a browser program for acquiring the display screen from the web server 3 and displaying the acquired display screen on the display unit 14.

Figure 3:
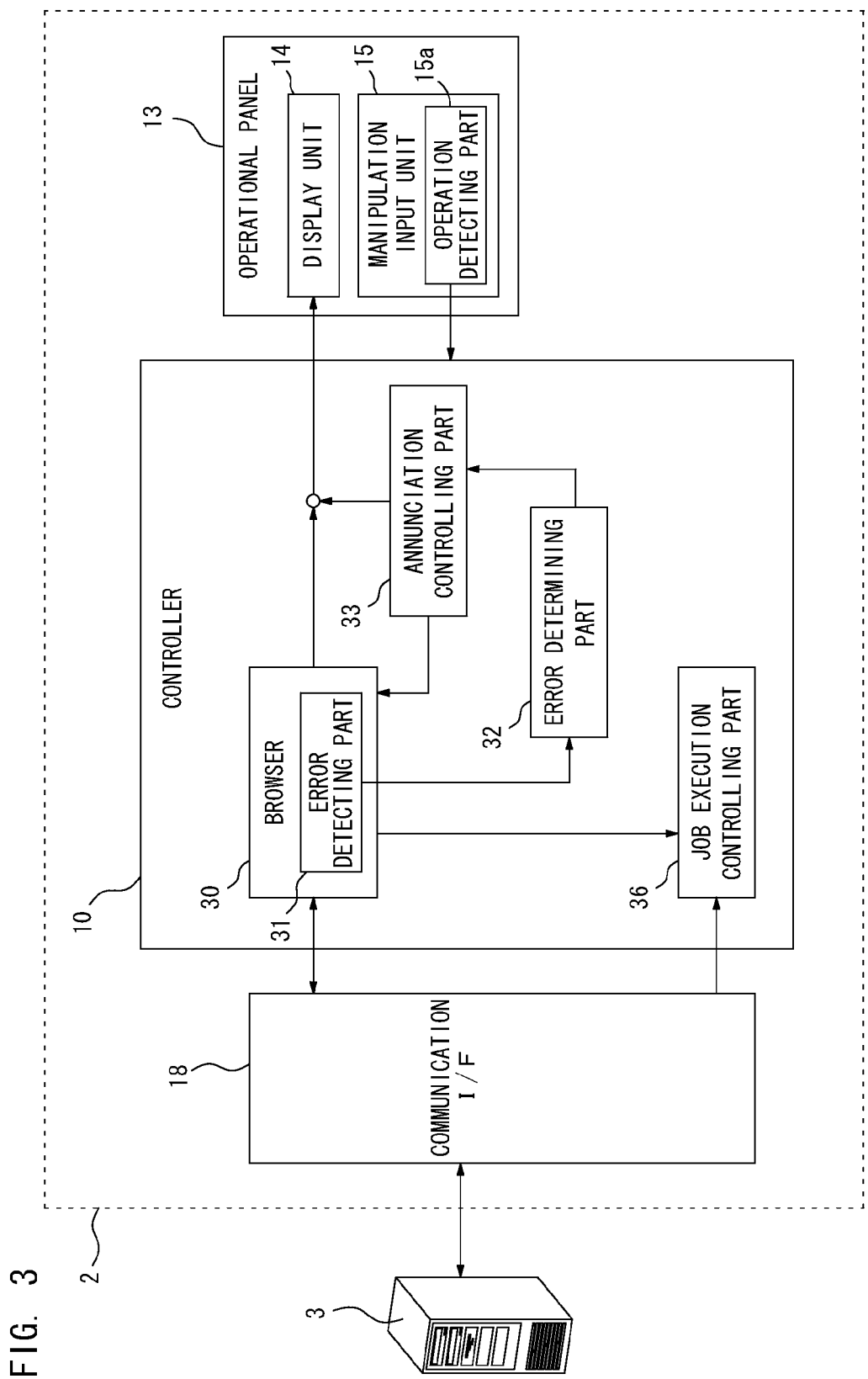
FIG. 3 is a block diagram showing the functional configuration realized when the image processing device functions as a display screen control device by execution of a program by a CPU of a controller.

FIG. 3 is a block diagram showing the functional configuration realized when the image processing device 2 functions as the display screen control device by execution of the program 21 by the CPU 11 of the controller 10. As shown in FIG. 3, the controller 10 functions as a browser 30, an error determining part 32, an annunciation controlling part 33 and a job execution controlling part 36.

Figure 4:
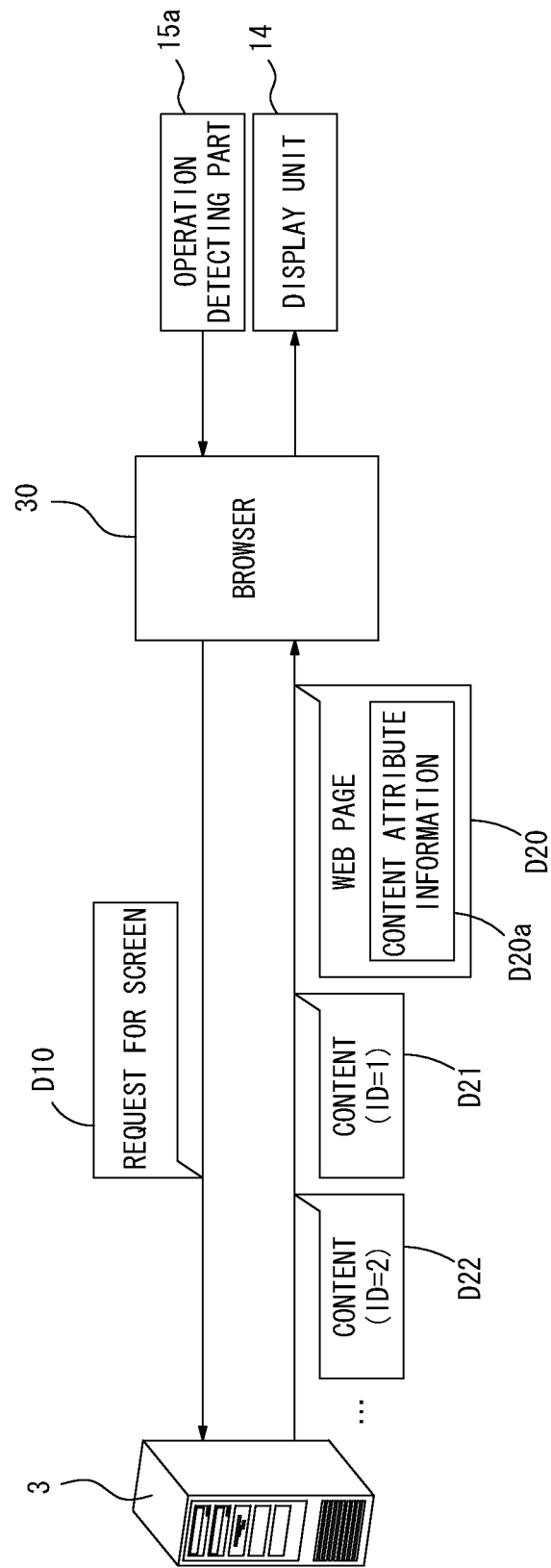
FIG. 4 conceptually shows data communication when a browser acquires a display screen from a web server and displays on a display unit.

The browser 30 acquires the display screen from the web server 3 via the communication interface 18 and displays the acquired display screen on the display unit 14 of the operational panel 13. FIG. 4 conceptually shows data communication when the browser 30 acquires the display screen from the web server 3 and displays on the display unit 14. As an operation made by the user is detected by the operation detecting part 15a, the browser 30 sends a request for screen D10 to the web server 3 to acquire the display screen corresponding to the operation made by the user. The web server 3 creates the display screen corresponding to the request for screen D10, and transmits to the browser 30. The display screen transmitted from the web server 3 to the browser 30 includes, for example as shown in FIG. 4, a web page D20 stated in a predetermined language such as HTML (Hypertext Markup Language) and contents D21 and D22 such as image data. An unique ID is assigned to each of the contents D21 and D22 as identification information. The web page D20 contains content attribute information D20a with which the corresponding ID of the contents D21 and D22 are associated. The content attribute information D20a is attribute information corresponding to each of the contents D21 and D22. The content attribute information D20a includes information defining a position of display or a display size of each of the contents D21 and D22. In addition to that, the content attribute information D20a includes information defining whether or not each content D21 and D22 is necessary for entry operation for the user and information such as a keyword or a comment relating to each content D21 and D22.

The browser 30 analyses the content attribute information D20a contained in the web page D20. So, the browser 30 specifies the information such as the position of display and the display size of each content D21 and D22, and lays each content D21 and D22 received from the web server 3 out on the display screen based on a result of the specification. The browser 30 outputs and displays the display screen on which each content D21 and D22 is laid out based on the web page D20 on the display unit 14.

Figure 5:
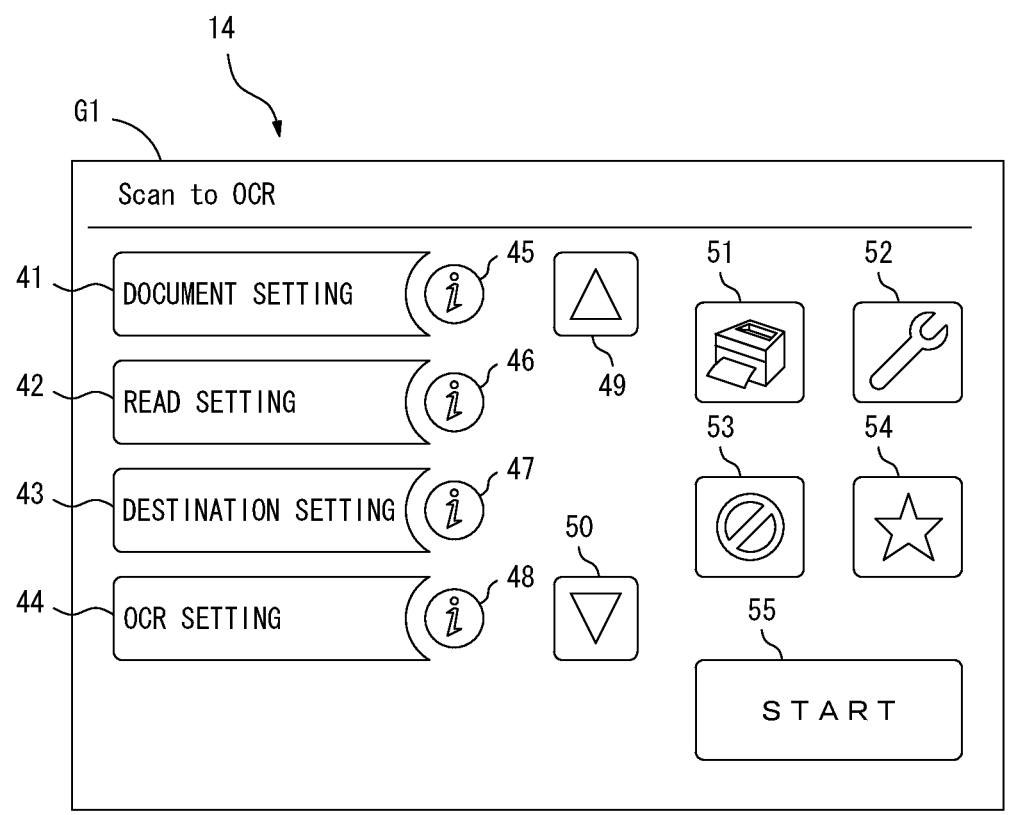
FIG. 5 showing a display screen displayed on the display unit when all of at least one content contained in the display screen is received normally by the browser.

FIG. 5 showing a display screen G1 displayed on the display unit 14 by the browser 30 is an example of a display when all of at least one contents contained in the display screen G1 are received normally. The display screen G1 is the display screen, for example, to use the OCR function, one of the application services provided by the web server 3. Multiple contents 41 to 55 received normally from the web server 3 as bitmapped images are displayed on the display screen G1. As an example, the contents 41 to 44 are setting keys to make variety of settings required to use the OCR function. The contents 45 to 48 are operation keys to display help information relating to the operation key corresponding to each of the contents 41 to 44. The contents 49 and 50 are operation keys to update the display screen G1 to another page. The contents 51 to 54 are operation keys to make other setting operations. The content 55 is a start key to give an instruction for start of execution of a job. If, however, the start key is arranged as one of the push-button keys arranged around the display unit 14, the start key 55 is not always necessary to be displayed on the display screen G1.

As shown in FIG. 5, all the contents 41 to 55 contained in the display screen G1 are displayed normally. Under this circumstance, the user may see the corresponding set item when he or she uses and operates the image processing device 2. The user makes an operation to press the content showing particular set item to change a set value corresponding to the set item. This operation is detected by the operation detecting part 15a, and an operation signal is output from the operation detecting part 15a to the browser 30. In response to receipt of the operation signal, the browser 30 identifies the content operated by the user. The browser 30 then sends the request for screen D10 to the web server 3 to acquire the display screen for setting operation corresponding to the operated content. So, the web server 3 transmits the display screen to change settings. As acquiring the display screen to change settings from the web server 3, the browser 30 displays the acquired display screen on the display unit 14.

Figure 6:
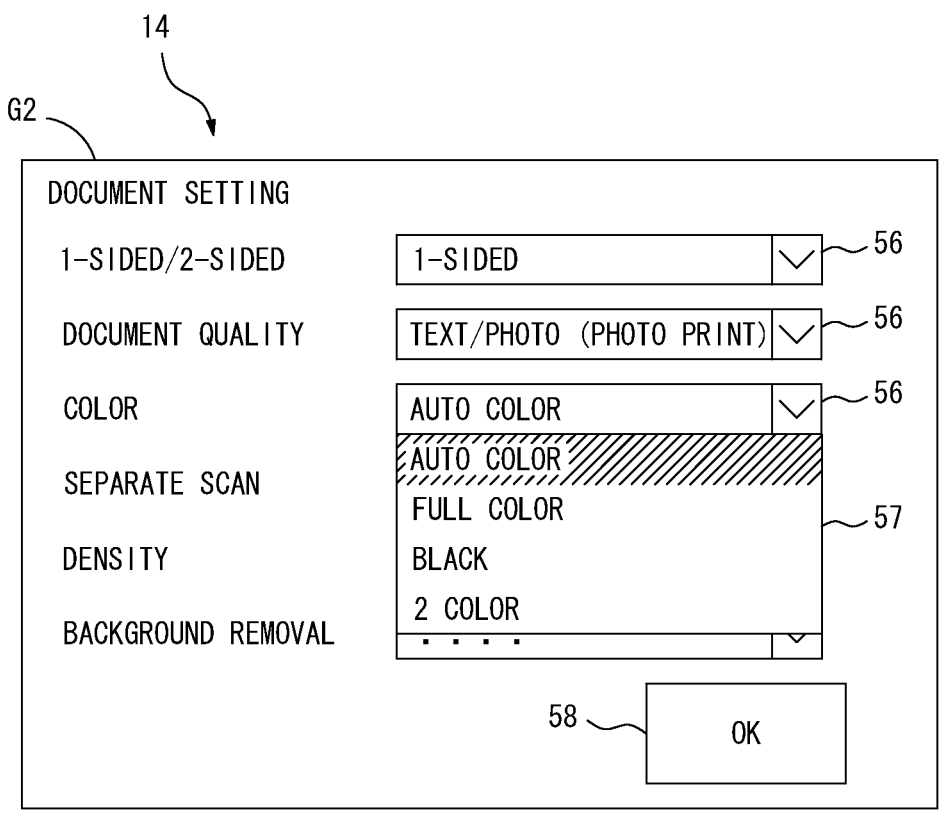
FIG. 6 shows an example of a display screen to change settings relating to document setting.

FIG. 6 shows an example of a display screen G2 to change settings relating to document setting. It is assumed that, for example, the user makes an operation to press the content 41 corresponding to the document setting with the display screen G1 shown in FIG. 5 being displayed on the display unit 14. In this case, the browser 30 acquires the display screen G2 of FIG. 6 from the web server 3 and displays on the display unit 14. The current set value corresponding to each of at least one set item and at least one pull-down key 56 to change the corresponding current set value are displayed on the display screen G2. As the pull-down key 56 is operated, the browser 30 displays a pull-down menu 57 as shown in FIG. 6. The user selects a desired set value from the pull-down menu 57 to change the set value. The user then presses an OK key 58 to fix the changed set value.

After detecting the OK key 58 of the display screen G2 pressed, the browser 30 again sends the request for screen D10 to the web server 3. The request for screen D10 sent to the web server 3 includes at least one set value selected by the user. The web server 3 again creates the display screen G1, and transmits the created display screen G1 to the browser 30. As the result, the browser 30 changes the display screen displayed on the display unit 14 from the display screen G2 of FIG. 6 back to the display screen G1 of FIG. 5. The content 41 corresponding to the document setting may include the set value selected by the user and be displayed. In this case, the user checks the detail of the display of the content 41 relating to the document setting after making the operation to change the set value. Therefore, the user is capable of knowing whether or not the desired set value is reflected correctly.

It is assumed that a heavy load is placed on the web server 3 or the network 4 at time of transmission of the request for screen D10 to the web server 3 by the browser 30 as described above. In this case, the browser 30 sometimes does not receive normally all of at least one content necessary for displaying the display screen G1 as shown in FIG. 5, for example. In such a circumstance, the browser 30 is not allowed to lay each content D21 and D22 out normally based on the web page D20 received from the web server 3. So, the incomplete display screen missing some of at least one contents are displayed on the display unit 14.

Figure 7:
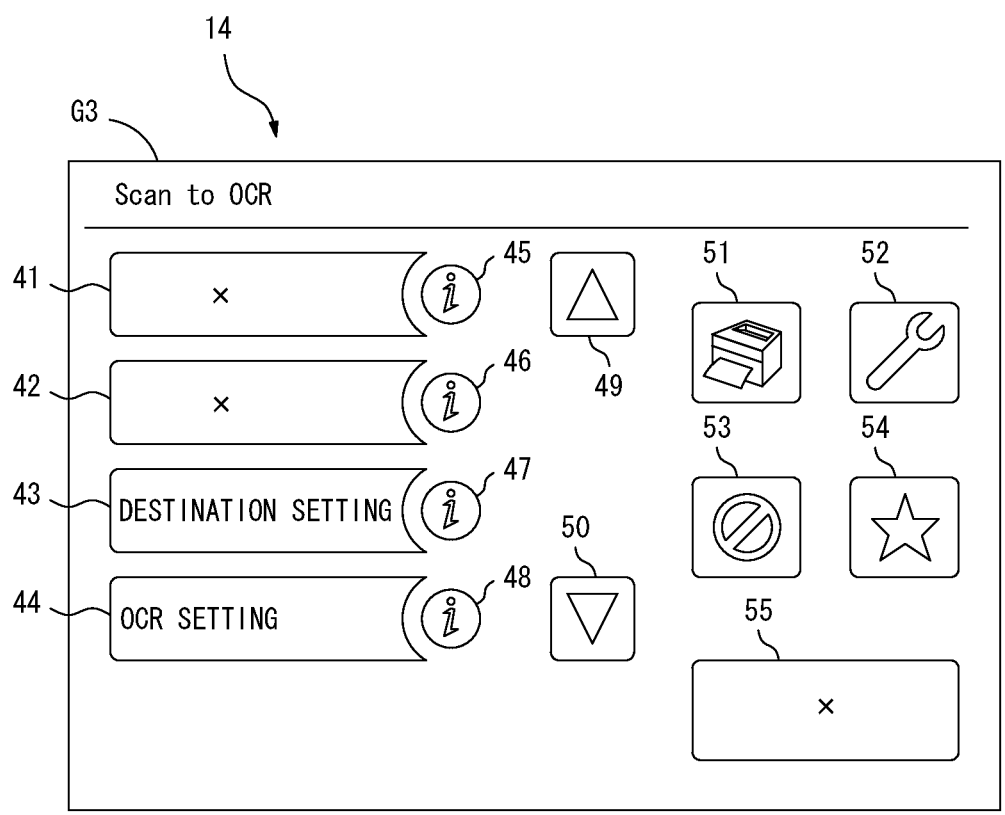
FIG. 7 is a display screen displayed on the display unit when some contents contained in the display screen are not received normally by the browser.

FIG. 7 is a display screen G3 displayed on the display unit 14 by the browser 30 showing an example of the display when the content 41 relating to the document setting, the content 42 relating to the document read setting and the content 55 relating to the start key contained in the display screen G1 of FIG. 5 are not received normally. Because the contents 41, 42, and 55 are not received normally by the browser 30, a predetermined mark (for instance, X mark) is displayed in the respective parts where the content suppose to be displayed on the display screen G3. To be more specific, the predetermined mark is an error display informing the user that the content is not displayed normally. This type of error is detected by the browser 30.

More specifically, the browser 30 includes an error detecting part 31 to detect the display error as shown in FIG. 3. The error detecting part 31 detects occurrence of the display error of a content included in the display screen acquired from the web server 3 by the browser 30 with the acquired display screen being displayed on the display unit 14. If, for example, the content is not laid out normally based on the content attribute information D20a of the web page D20, the error detecting part 31 detects that the content is not displayed normally and detects the occurrence of the display error. The error detecting part 31 is put into operation as a part of functions of the browser 30. During the activation of the browser 30, the error detecting part 31 is capable of detecting occurrence of the display error.

With reference to FIG. 7, as the content 41 relating to the document setting and the content 42 relating to the document read setting are not displayed, the user is not able to make a setting operation required to use the OCR function. In FIG. 7, the start key 55 is not displayed either, so the user is not able to give the instruction for start of the execution of the job. Moreover, in case of the display shown in FIG. 7, the user may not even know what content (that is operation key) is not being displayed.

In the first preferred embodiment, in response to detection of the display error by the error detecting part 31, the error determining part 32 and the annunciation controlling part 33 are put into operation. The error determining part 32 determines whether or not the content not being displayed on the display screen G3 is necessary for the user to continue the entry operation. If the content is necessary, an annunciation image is displayed on the display unit 14 to alert the user for another acquisition of the display screen. If the content not being displayed on the display screen G3 is not necessary for the user to continue the entry operation, the annunciation image is not displayed, and the entry operation by the user is continued. When the start key 55 is pressed by the user, the job execution controlling part 36 is put into operation to start execution of the job in the image processing device 2. The operation is explained more in detail below.

The browser 30 displays the display screen acquired from the web server 3 on the display unit 14 sequentially. The error detecting part 31 detects the occurrence of the display error on the display screen at the same time as the display screen to be displayed on the display unit 14 by the browser 30. The error detecting part 31 then outputs the result of the detection to the error determining part 32. When the display error is occurred, the error detecting part 31 identifies ID of the content not displayed normally on the display unit 14, and reports the identified ID to the error determining part 32.

The error determining part 32 determines the occurrence of the display error based on the result of detection received from the error detecting part 31. When the display error is occurred, the error determining part 32 identifies the content not displayed on the display screen (that is the content in which the display error is detected) based on the ID of the content received from the error detecting part 31. The error determining part 32 then determines whether or not the identified content is necessary for the user to continue the entry operation. The error determining part 32 determines based on the content attribute information D20a contained in the web page D20 whether or not the content identified as not being displayed is necessary for the user to continue the entry operation.

By way of example, it is assumed that the contents 41 to 44 that are the setting keys to use the OCR function and the content 55 that is the start key are not displayed normally on the display screen G1 of FIG. 5. In such a case, each content not being displayed is determined as the necessary content for the user to continue the entry operation. On the other hand, even when the contents 45 to 54 corresponding to other operation keys are not displayed normally, each content is determined as the unnecessary content for the user to continue the entry operation.

There are following three ways for the error determining part 32 to determine the content based on the content attribute information D20a.

A first way is explained first. As described above, the content attribute information D20a contains the information which defines whether or not each content D21 and D22 is the content necessary for the user to make the entry operation. When such information is contained in the content attribute information D20a, the error determining part 32 refers to the information, thereby determining whether or not the content not being displayed is the content necessary for the user to make the entry operation. By way of example, when the information defining whether or not the content is necessary shows a predetermined value, the content is determined to be necessary for the user to make the entry operation. When the information does not show the predetermined value, the content is determined to be unnecessary for the user to make the entry operation.

In order to apply the first way, however, information which allows the error determination part 32 to determine a type of the content needs to be generated at time of creation of the display screen in the web server 3. In other words, a rule of the web server 3 to generate the information indicating whether or not the content is necessary and a rule of the error determination part 32 to determine the information showing whether or not the content is necessary need to be standardized. If the rules of the web server 3 and the error determination part 32 are different from each other, it sometimes is not capable of determining whether or not the content is necessary for the user to make the entry operation with the first way. The error determining part 32 applies a second way then.

The second way is to determine based on information included in the content attribute information D20a. The information included in the content attribute information D20a is such as a keyword or a comment related to the corresponding content D21 and D22. The error determining part 32 reads, from the content attribute information D20a, the information such as the keyword or the comment related to the content in which the display error is detected. If a predetermined character strings such as "document setting," "read setting," "destination setting," "OCR setting," or "start" is contained in the information such as the keyword or the comment, the error determining part 32 determines the content not being displayed is necessary for the user to make the entry operation. If none of the predetermined character strings is contained, the error determining part 32 determines the content not being displayed is unnecessary for the user to make the entry operation.

In order to apply the second way, the information such as the keyword or the comment related to corresponding content needs to be generated and included in the content attribute information D20a at time of creation of the display screen in the web server 3. When, for example, such information is not generated by the web server 3, the error determining part 32 is sometimes not capable of determining whether the content is necessary for the user to make the entry operation with the second way. In this case, the error determining part 32 applies a third way described next.

The third way is to determine at least one content not being displayed is the necessary content for the user to make the entry operation when the content not being displayed covers a region exceeds a predetermined proportion to a screen size of the display unit 14. To be more specific, a display size of each content is defined in the content attribute information D20a. The error determining part 32 makes a comparison, based on the defined display sizes, between display size of each content in which the display error is detected and the screen size of the display unit 14. It is assumed the proportion of the region in which the content is not displayed normally is equal or greater than the predetermined proportion to the screen size of the display unit 14. In such a case, the error determining part 32 determines that the content necessary for the user to make the entry operation is not being displayed. The predetermined proportion is set, for instance, approximately 50%. The third way is not capable of correctly determining whether or not the content is necessary for the user to make the entry operation. It is said, however, the content necessary for the user to make the entry operation is defined to be displayed at a larger size than other contents in general.

Therefore, when the proportion of the region in which the content is displayed normally to the screen size does not exceed the predetermined proportion, it is possible that the content necessary for the user to make the entry operation is included in the undisplayed contents. Erroneous determination is not likely to be made.

The error determining part 32 applies one of the first to the third ways as described above. So, the error determining part 32 determines whether or not the content not displayed normally on the display screen of the display unit 14 is necessary for the user to continue the entry operation. As a result, when the error determining part 32 determines the content not being displayed on the display screen is necessary for the user to continue the entry operation, the annunciation controlling part 33 is put into operation. The error determining part 32 determines that the necessary content for the user to continue the entry operation is not displayed not only when the content is not displayed but also when the browser 30 could not receive the web page D20 normally from the web server 3. The annunciation controlling part 33 is put into operation then.

When the error determining part 32 determines the content not displayed on the display screen is unnecessary for the user to continue the entry operation, the user is allowed to continue the entry operation with the display as it is. So, the annunciation controlling part 33 is not put into operation. When only an image content such as that simply for decoration of a screen or that of a key such as an operation key does not affect the execution of job is not displayed on the display screen of the display unit 14, the display is continued as it is.

It is assumed, for example, the display screen G3 in which the display error is occurred as illustrated in FIG. 7 is displayed by the browser 30. In this case, the contents 41 and 42 relating to "document setting" and "read setting" and the content 55 relating to the start key are not displayed normally. So, the error determining part 32 determines that the necessary content for the user to continue the entry operation is not displayed. In this case, the annunciation controlling part 33 is put into operation.

The annunciation controlling part 33 controls to display or not to display the annunciation image to alert the user to again acquire the display screen on the display unit 14 based on the result of the determination of the error determining part 32. As it is determined by the error determining part 32 that the necessary content for the user to continue the entry operation is not displayed normally, the annunciation controlling part 33 displays the annunciation image on the display unit 14.

Figure 8:
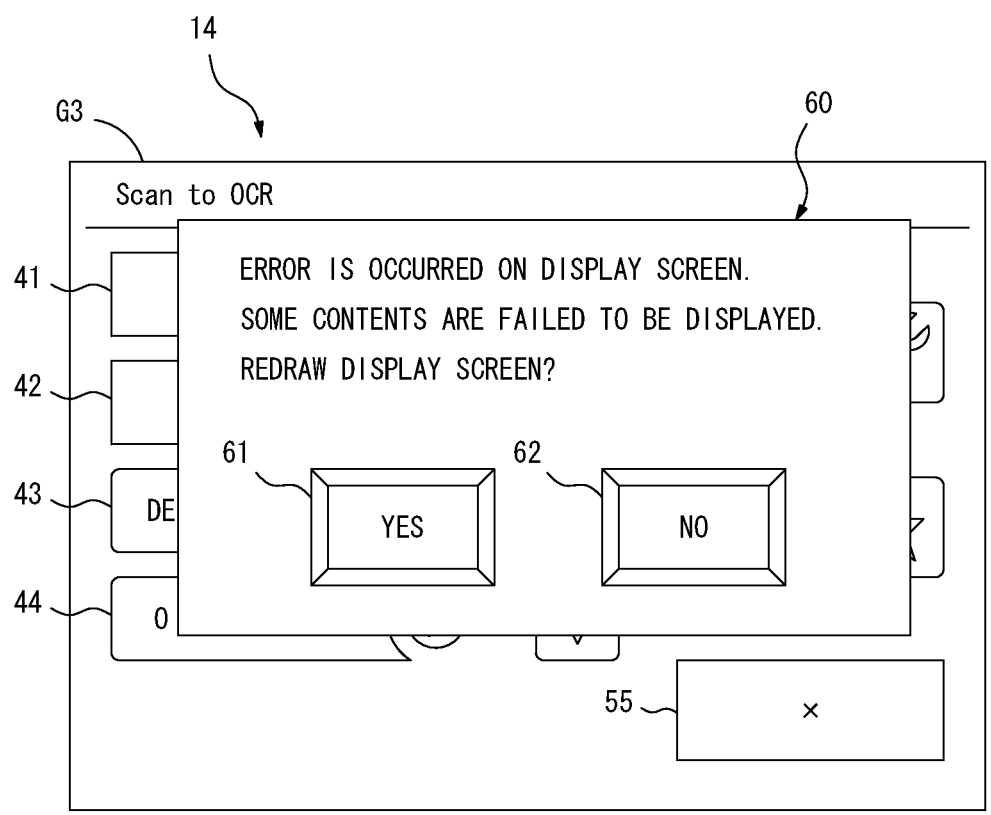
FIG. 8 shows an example of an annunciation image displayed on the display unit by an annunciation controlling part.

FIG. 8 shows an example of an annunciation image 60 displayed on the display unit 14 by the annunciation controlling part 33. The annunciation image 60 comes to the front of the display screen G4 displayed by the browser 30, for instance. The annunciation image 60 includes a message indicating an occurrence of the display error on the display screen G3 displayed on the display unit 14 by the browser 30. This message alerts the user to again acquire the display screen. In addition, the annunciation image 60 includes a redraw button 61 to give an instruction for another acquisition of the same display screen from the web server 3 to the browser 30 and a button 62 to give an instruction not to redraw under the message.

In the example of FIG. 8, the annunciation image 60 is displayed on the display unit 14 by the annunciation controlling part 33, however it is not limited to this. As an example, the annunciation controlling part 33 may gives an instruction to display the annunciation image 60 to the browser 30. In this case, the browser 30 creates the annunciation image 60 based on the instruction from the annunciation controlling part 33, and displays the annunciation image 60 thereby created to the front of the display unit 14.

The annunciation image 60 shown in FIG. 8 is displayed, so that the user is allowed to know the content necessary to continue the entry operation is not displayed normally. When the user would like the display screen to be acquired again and the content necessary to continue the entry operation to be displayed normally, he or she presses the redraw button 61. When the user determines there is no need for the display screen to be redrawn, he or she presses the button 62.

After the redraw button 61 or the button 62 is operated by the user, the annunciation controlling part 33 changes not to display the annunciation image 60. Specifically, when the redraw button 61 is operated by the user, the annunciation controlling part 33 changes not to display the annunciation image 60, and gives an instruction to again acquire the display screen currently displayed on the display unit 14 from the web server 3 to the browser 30.

As the result, the browser 30 again acquires the current display screen from the web server 3 and updates the display screen displayed on the display unit 14. So, the display screen displayed on the display unit 14 is updated from, for example, the display screen G3 in which the display error is occurred as shown in FIG. 7 to the display screen G1 in which no display error is occurred as shown in FIG. 5. It is assumed that the browser 30 again acquires the same display screen from the web server 3. When the display error is again detected in such a case, the same processing as described above is executed. As all the contents necessary for the user to make the entry operation are displayed normally, the user may continue the entry operation to the operational panel 13. So, the user is allowed to realize the desired settings and make execution of the job.

The start key is pressed by the user and an instruction for execution of the job is given. In response to the instruction, the job execution controlling part 36 is put into operation. The job execution controlling part 36 controls operation of each part, thereby controlling execution of the job specified by the user. The job execution controlling part 36 is put into operation to start execution of the job in the image processing device 2. When, for example, the job uses the above-described OCR function, the job execution controlling part 36 controls the scanner unit 16 to execute read operation of the document. The job execution controlling part 36 acquires the image data and transmits the acquired image data to the web server 3.

Figure 9:
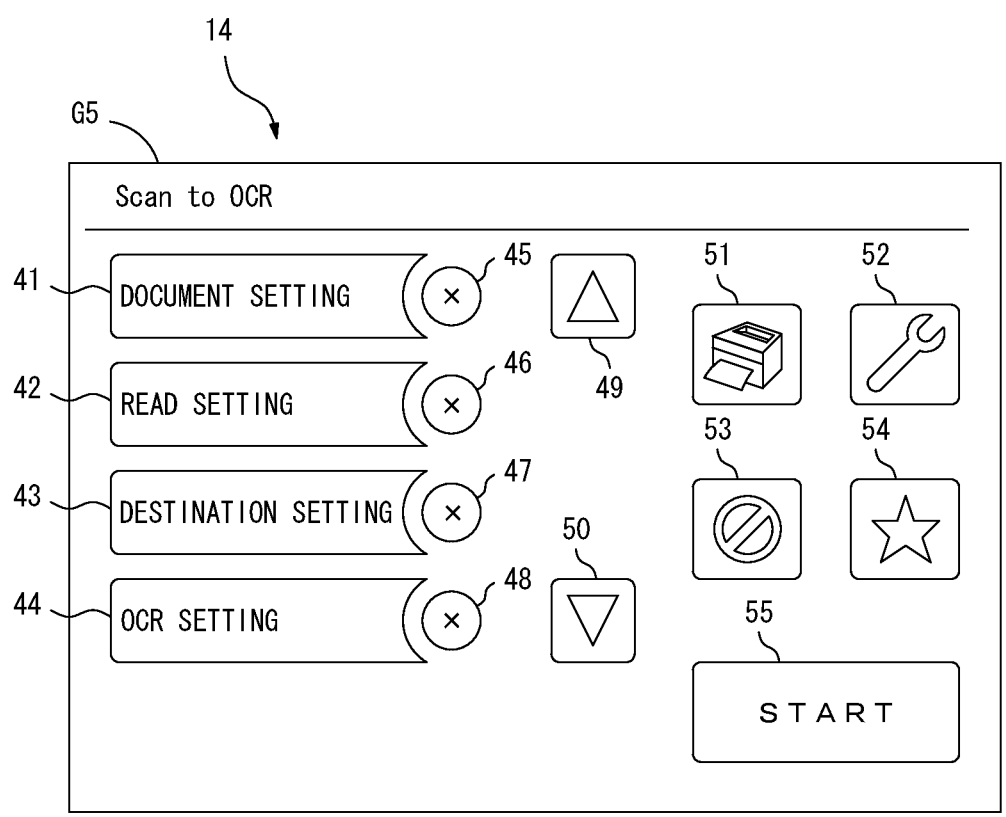
FIG. 9 shows a display screen when a content does not affect continuation of a setting operation of a user is not displayed.

Even when the display error is detected by the error detecting part 31, the above-described annunciation image 60 is not displayed if the undisplayed content is unnecessary for the user to make the entry operation. When, for example, the contents 45 to 48 are not displayed with a display screen G5 being displayed by the browser 30 as illustrated in FIG. 9, the annunciation image 60 is not displayed. The contents 45 to 48 are operation keys to display help information relating to each setting key corresponding to the contents 41 to 44 as explained above. So, even those operation keys are not displayed normally on the display screen G5, the user may continue the entry operation. In such a case, the annunciation image 60 is not displayed, and another acquisition of the display screen by the browser 30 is not executed either. The user is not required to select whether or not to redraw. So, the user is allowed to continue the entry operation for the variety of settings and for giving the instruction for execution of the job with the display screen. Therefore, the operability improves.

Figure 10:
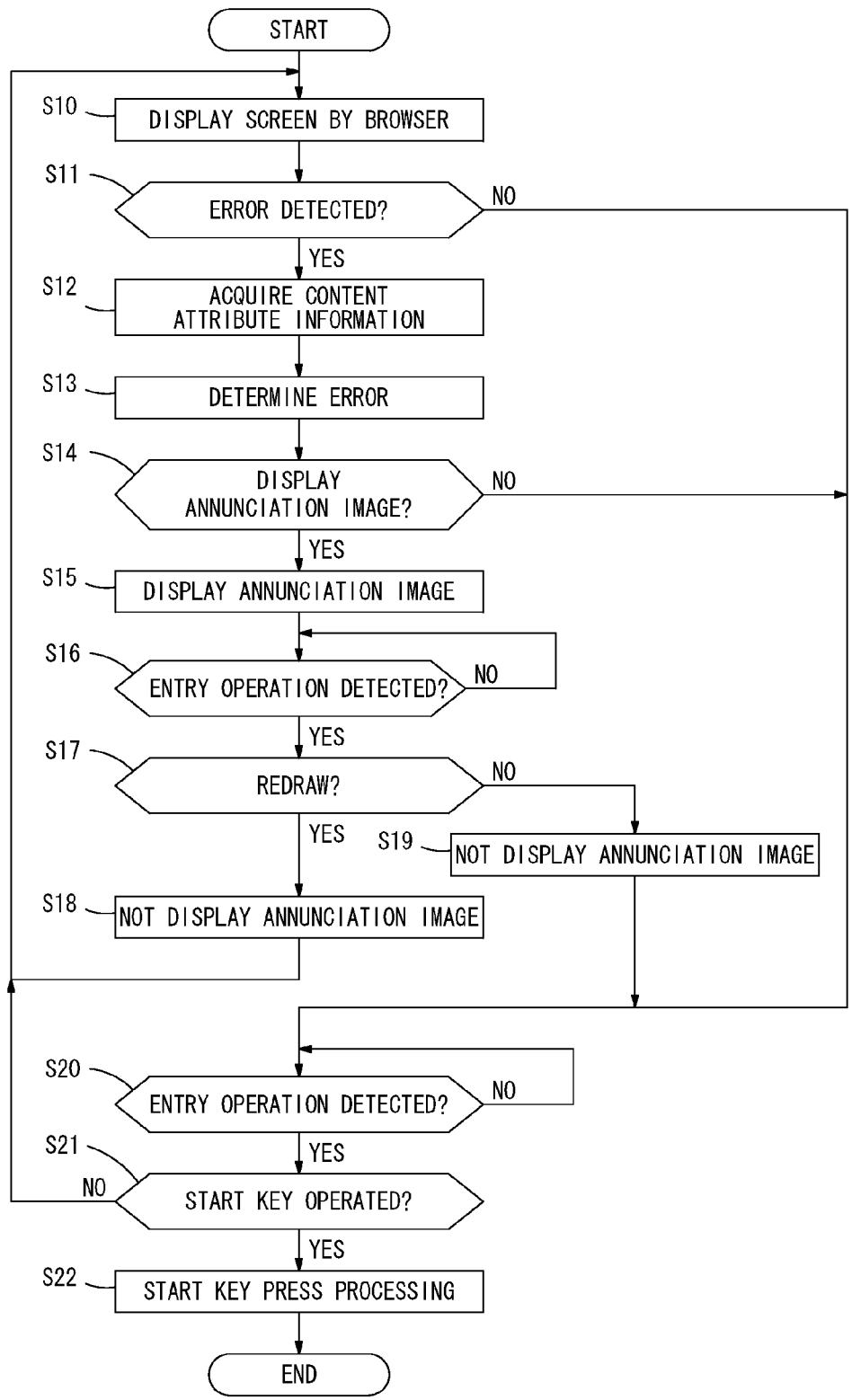
FIG. 10 is a flow diagram explaining the process sequence of a processing executed by the controller in the first preferred embodiment.

The detail of operation of the controller 10 of the first preferred embodiment is described next. FIG. 10 is a flow diagram explaining the process sequence of a processing executed by the controller 10. In response to the start of the processing, the controller 10 first activates the browser 30. The browser 30 sends the request for screen D10 to the web server 3. The browser 30 acquires the display screen from the web server 3 and displays on the display unit 14 (step S10). The browser 30 determines whether or not the display error occurred on the display screen is detected by the error detecting part 31 (step S11). If the display error is not detected, the controller 10 proceeds to step S20.

When the display error is detected on the display screen displayed on the display unit 14 (when a result of step S11 is YES), the error determining part 32 is put into operation to acquire the content attribute information D20a corresponds to the content in which the display error is detected (step S12). The error determining part 32 executes error determination based on the content attribute information D20a, and determines whether or not the content necessary for the user to make the entry operation is not being displayed (step S13). The error determining part 32 then determines whether or not to display the annunciation image 60 based on a result of the determination (step S14). If the content necessary for the user to make the entry operation is not displayed, the result becomes YES. The annunciation controlling part 33 is then put into operation. If the content not being displayed is unnecessary for the user to make the entry operation, the result becomes NO. The controller 10 then proceeds to step S20.

As displaying the annunciation image 60, the annunciation controlling part 33 displays the annunciation image 60 as shown in FIG. 8 at the front of the display unit 14 (step S15). The annunciation controlling part 33 is put into a waiting state until the entry operation by the user is detected (step S16). In response to the detection of the entry operation by the user (when a result of step S16 is YES), the annunciation controlling part 33 determines whether or not the redraw button 61 is operated (step S17). When the redraw button 61 is operated (when a result of step S17 is YES), the annunciation controlling part 33 changes not to display the annunciation image 60 displayed on the display unit 14 (step S18). The processing returns to step S10. In this case, the browser 30 again sends another request for screen to the web server 3, so the display screen in which the display error is detected is again acquired by the browser 30. The display screen of the display unit 14 is updated.

When the redraw button 61 is not operated by the user (when a result of step S17 is NO), the annunciation controlling part 33 changes not to display the annunciation image 60 displayed on the display unit 14 (step S19). The processing moves to step S20.

As the processing comes to step S20, the browser 30 is put into the waiting state until the entry operation by the user is detected (step S20). After detecting the entry operation made by the user (when a result of step S20 is YES), the browser 30 determines whether or not the start key is operated (step S21). When the start key is not operated by the user (when a result of step S21 is NO), the processing returns to step S10. In such a case, the browser 30 sends the request for screen D10 to the web server 3 to acquire another display screen corresponding to the entry operation made by the user from the web server 3. The browser 30 acquires the display screen corresponding to the entry operation made by the user from the web server 3, and changes the display screen of the display unit 14 to another.

When the start key is operated by the user (when a result of step S21 is YES), the browser 30 puts the job execution controlling part 36 into operation. The job execution controlling part 36 executes a start key press processing (step S22). The start key press processing includes a processing to start execution of the job specified by the user. After the start key is operated by the user, the execution of the job is started in the image processing device 2.

As explained above, the image processing device 2 of the first preferred embodiment includes the browser 30, the error detecting part 31, the error determining part 32 and the annunciation controlling part 33. The browser 30 is responsible for acquiring the display screen for the user to make the entry operation and displaying the acquired display screen on the display unit 14. The error detecting part 31 is responsible for detecting occurrence of the display error of the content contained in the display screen acquired from the web server 3 with the display screen being displayed. The error determining part 32 is responsible for determining whether or not the content in which the display error is detected is necessary for the user to continue the entry operation when the display error is detected by the error detecting part 31. The annunciation controlling part 33 is responsible for displaying the annunciation image 60 to alert the user for another acquisition of the display screen on the display unit 14 based on the result of determination made by the error determining part 32.

It is assumed some or all of the contents are not displayed normally on the display screen displayed on the display unit 14 by the browser 30. According to the above-described configuration, in such a case, if the content not displayed normally is necessary for the user to continue the entry operation, the annunciation image 60 is displayed on the display unit 14. If the content not displayed normally is unnecessary for the user to continue the entry operation, the annunciation image 60 is not displayed on the display unit 14.

With the annunciation image 60 displayed on the display unit 14, the user is allowed to know that the content necessary to continue the entry operation is not displayed normally. The redraw button 61 to give the instruction for another acquisition of the same display screen from the web server 3 to the browser 30 is included in the annunciation image 60. The redraw button 61 is pressed by the user as required, and the display screen displayed on the display unit 14 may be updated. To be more specific, it is assumed information such as a tool bar to make the operation for giving instructions to the browser 30 is not displayed. Even in this case, as the redraw button 61 included in the annunciation image 60 is pressed by the user, another acquisition of the display screen by the browser 30 may be executed. Therefore, operation is easy for the user.

Even when the content not displayed normally is contained in the display screen displayed on the display unit 14 by the browser 30, the user is allowed to know all the contents that he or she needs to continue the entry operation are displayed normally if the annunciation image 60 is not appeared on the display unit 14. So, the user may continue the entry operation with the display screen without concerning the undisplayed content, resulting in improvement in operability.

As explained above, the image processing device 2 of the first preferred embodiment does not cause the user to make needless operation when the content contained in the display screen acquired from the web server 3 is not displayed normally. The image processing device 2 is capable of allowing the user to continue his or her operation appropriately.

In the first preferred embodiment, the error determining part 32 may execute error determination at time of completion of the display processing of the display screen acquired from the web server 3 by the browser 30 or during the display processing of the display screen by the browser 30. More specifically, the error detecting part 31 is capable of executing error detection in parallel with the display processing of the display screen by the browser 30. Therefore, the error determining part 32 may execute the error determination at time of detection of the display error by the error detecting part 31 during the display processing of the display screen. In this case, even if the display processing of the display screen acquired from the web server 3 has not completed, the annunciation image 60 is displayed at time when the error determining part 32 detects that the content necessary for the user to continue the entry operation is not displayed normally. As the result, the user is not required to wait for the display processing of the display screen by the browser 30 to be completed, and is able to give the instruction for another acquisition of the display screen to the browser 30.

As described above, it is assumed the display error of the content contained in the display screen acquired from the web server by the browser is detected with the acquired display screen being displayed. In this case, it is determined whether or not the content in which the display error is detected is necessary for the user to continue the entry operation. Based on a result of the determination, the annunciation image alerts the user to again acquire the display screen is displayed and sometimes is not displayed on the display unit. So, when the content not displayed normally on the display unit is necessary for the user to continue the entry operation, the user may be alerted to again acquire the display screen. When the content not displayed normally on the display unit is unnecessary for the user to continue the entry operation, the user may continue his or her operation appropriately without making needless operation.

Second Preferred Embodiment

A second preferred embodiment of the present invention is described next. In the second preferred embodiment, an example of displaying the annunciation image on the display unit 14 at different timing from the first preferred embodiment is described below. Each configuration of the image processing system 1 and the image processing device 2 of the second preferred embodiment is the same as that of the first preferred embodiment.

Figure 11:
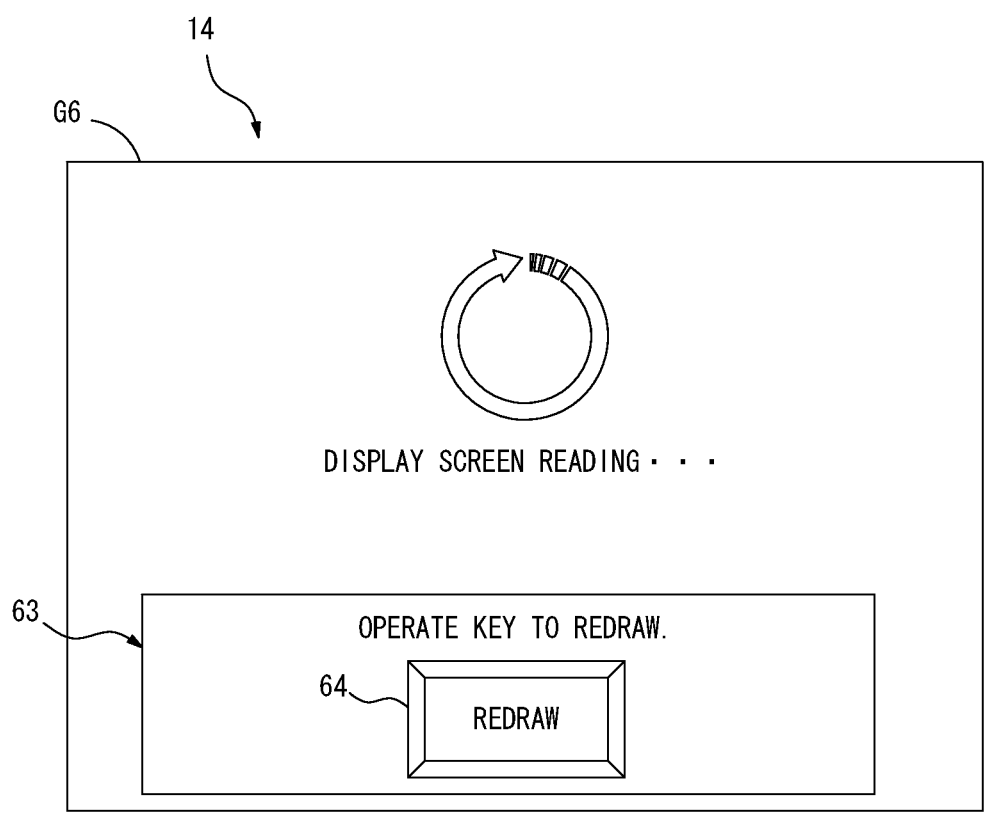
FIG. 11 shows an example of a display screen of the display unit soon after the browser sends a request for screen to the web server.

According to the second preferred embodiment, the browser 30 sends the request for screen D10 to the web server 3, and puts the annunciation controlling part 33 into operation at time of start of the display processing of the display screen acquired from the web server 3 to display the annunciation image on the display unit 14. FIG. 11 shows an example of a display screen G6 of the display unit 14 soon after the browser 30 sends the request for screen D10 to the web server 3. After sending the request for screen D10 to the web server 3, the browser 30, for example, displays the display screen G6 showing that the display screen is being read from the web server 3 as shown in FIG. 11.

After the operation to acquire and to display the display screen is started by the browser 30, the annunciation controlling part 33 displays an annunciation image 63 as shown in FIG. 11 on the display unit 14. The annunciation image 63 comes to the front of the display screen G6 displayed by the browser 30, for example. The annunciation image 63 includes a message to the user and a redraw button 64 to give the instruction for another acquisition of the same display screen from the web server 3 to the browser 30. This annunciation image 63 is preferably displayed small in the corner of the display screen G6.

The browser 30 acquires the web page D20 and the contents D21 and D22 making up the display screen sequentially from the web server 3. In response to the acquisition, the browser 30 updates the display screen G6, and displays the display screen acquired from the web server 3 sequentially. When the content making up the display screen may not be acquired normally from the web server 3, a predetermined mark (for example, X mark) is displayed in the respective parts where the content suppose to be displayed in the display processing of the display screen.

While the display processing is executed, the user may check the state of the display of each content displayed sequentially on the display unit 14. The user sometimes finds that the necessary content is not displayed at a relatively early stage since the display processing by the browser 30 is started. In such a case, in the second preferred embodiment, the annunciation image 63 has been displayed on the display unit 14. So, the user is able to operate the redraw button 64 immediately to give the instruction for another acquisition of the same display screen to the browser 30.

The annunciation controlling part 33 of the second preferred embodiment displays the annunciation image 63 at the time of start of the acquisition operation of the display screen by the browser 30 as described above. If, however, the display error is not detected by the error detecting part 31 when the display processing of the display screen by the browser 30 is completed, the annunciation controlling part 33 changes not to display the displayed annunciation image 63. Even when the display error is detected by the error detecting part 31, the annunciation controlling part 33 changes not to display the annunciation image 63. That is when the content not displayed on the display unit 14 is determined to be unnecessary for the user to continue the entry operation as the result of the error determination executed by the error determining part 32. So, the user may continue the entry operation with the display screen.

It is assumed that the display error is detected by the error detecting part 31 when the display processing of the display screen by the browser 30 is completed. In addition, the content not displayed on the display unit 14 is determined as the necessary content for the user to continue the entry operation by the error determining part 32. In this case, the annunciation controlling part 33 continues to display the annunciation image on the display unit 14. The annunciation image to be displayed on the display unit 14 here may be changed from the annunciation image 63 of FIG. 11 to the annunciation image 60 of FIG. 8. As the result, the user is able to know the undisplayed content on the display unit 14 is necessary for the user to continue the entry operation. The user operates the redraw button 61 or 64, and the display screen is updated.

Figure 12:
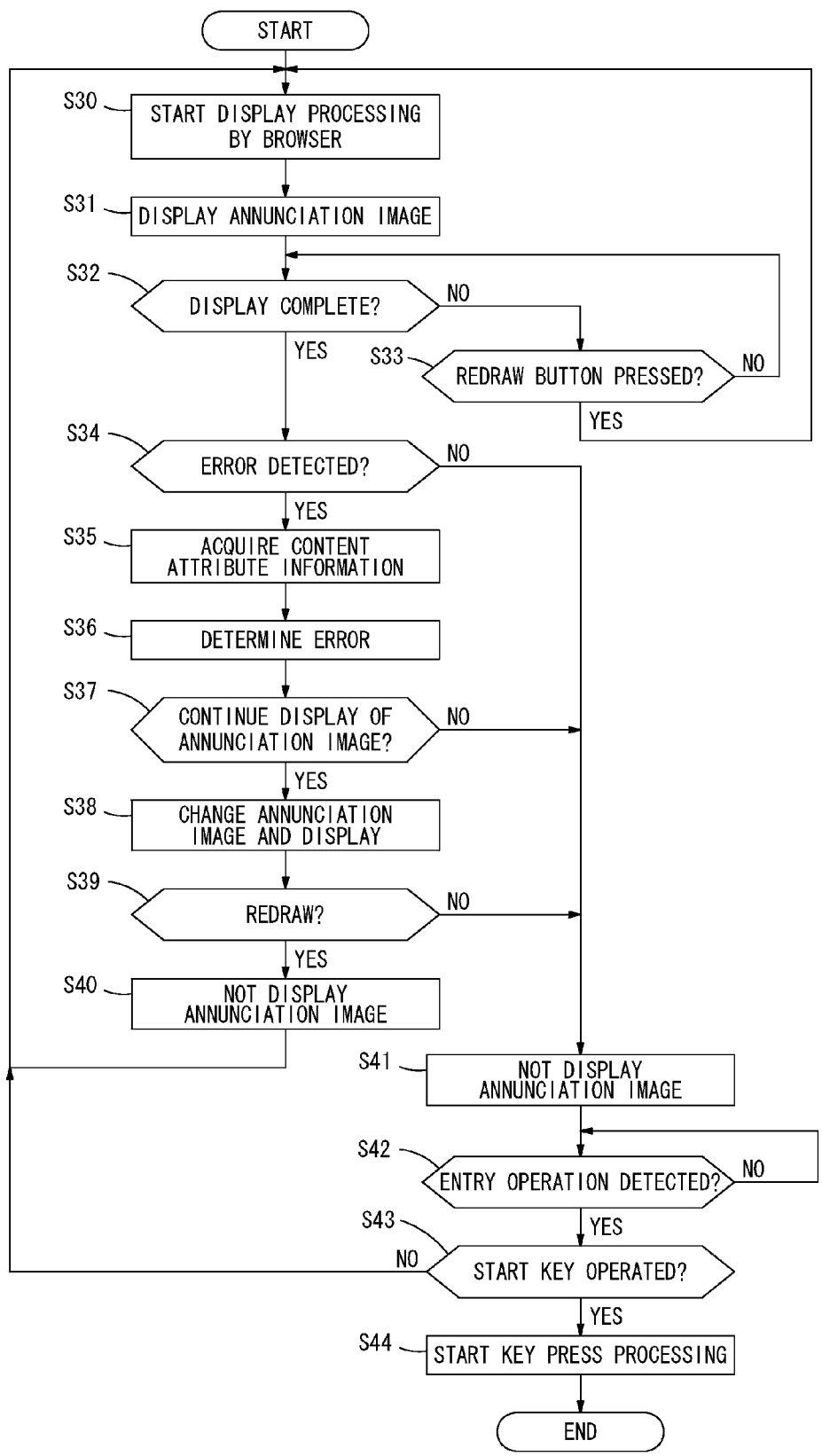
FIG. 12 is a flow diagram explaining the process sequence of a processing executed by the controller in the second preferred embodiment.

The detail of operation of the controller 10 of the second preferred embodiment is described next. FIG. 12 is a flow diagram explaining the process sequence of a processing executed by the controller 10. In response to start of the processing, the controller 10 first starts the display processing by the browser 30 (step S30). The browser 30 sends the request for screen D10 to the web server 3, and starts a processing to acquire the display screen from the web server 3 and display on the display unit 14. The controller 10 puts the annunciation controlling part 33 into operation to display the annunciation image 63 on the display unit 14 (step S31). The display screen of FIG. 11 is displayed on the display unit 14.

The controller 10 then determines whether or not the display processing of the display screen by the browser 30 is complete (step S32). When the display processing is not completed (when a result of step S32 is NO), the controller 10 determines whether or not the redraw button 64 is pressed by the user (step S33). When the press operation to the redraw button 64 made by the user is not detected, the controller 10 returns to step S32. The determination processing in step S32 and S33 is executed repeatedly until the display processing by the browser 30 is complete or the press operation to the redraw button 64 by the user is detected.

As the press operation to the redraw button 64 by the user is detected until the display processing by the browser 30 is complete (when a result of step S33 is YES), the controller 10 gives the instruction to acquire again the same display screen to the browser 30, and returns to step S30. In this case, the browser 30 completes the current display processing, and again sends the request for screen D10 to the web server 3. The browser 30 then starts the processing to again acquire the same display screen from the web server 3 and display to the display unit 14.

When the display processing by the browser 30 is complete without the press operation to the redraw button 64 by the user detected (when a result of step S32 is YES), the controller 10 determines whether or not the display error on the display screen is detected by the error detecting part 31 (step S34). If the display error is not detected, the controller 10 moves to step S41.

As the display error on the display screen displayed on the display unit 14 is detected (when a result of step S34 is YES), the error determining part 32 is put into operation to acquire the content attribute information D20a corresponding to the content in which the display error is detected (step S35). The error determining part 32 executes error determination based on the content attribute information D20a and determines whether necessary content for the user to make the entry operation is not displayed (step S36). The error determining part 32 then determines whether or not to continue the display of the annunciation image 63 based on a result of the error determination (step S37). As the necessary content for the user to make the entry operation is not displayed, the result becomes YES, and the processing moves to step S38. When the undisplayed content is not the necessary content for the user to make the entry operation, the result becomes NO, and the processing moves to step S41.

When the display of the annunciation image 63 is continued, the annunciation controlling part 33 changes, for example, the annunciation image being displayed on the display unit 14 from the annunciation image 63 of FIG. 11 to the annunciation image 60 of FIG. 8, thereby continuing the display of the annunciation image (step S38). The annunciation controlling part 33 is put into a waiting state until the entry operation by the user is detected. In response to the detection of the entry operation by the user, the annunciation controlling part 33 determines whether or not the redraw button 61 is operated (step S39). As the redraw button 61 is operated (when a result of step S39 is YES), the annunciation controlling part 33 changes not to display the annunciation image 60 displayed on the display unit 14 (step S40). The processing returns to step S30. In this case, the browser 30 again sends another request for screen D10 to the web server 3, so acquires again the display screen in which the display error is detected. The display screen of the display unit 14 is updated.

As the redraw button 61 is not operated by the user (when a result of step S39 is NO), the processing moves to step S41.

As the processing moves to step S41, the annunciation controlling part 33 changes not to display the annunciation image 60 or 63 displayed on the display unit 14 (step S41). The browser 30 is put into a waiting state until the entry operation by the user is detected (step S42). In response to the detection of the entry operation by the user (when a result of step S42 is YES), the browser 30 determines whether or not the start key is operated (step S43). When the operation by the user is not an operation to the start key (when a result of step S43 is NO), the processing returns to step S30. In such a case, in order to acquire another display screen corresponds to the entry operation by the user from the web server 3, the browser 30 sends the request for screen D10, and starts the display processing of another display screen.

When the operation by the user is an operation to the start key (when a result of step S43 is YES), the browser 30 puts the job execution controlling part 36 into operation. The job execution controlling part 36 then executes the start key press processing (step S44). The start key press processing includes the processing to start execution of the job specified by the user. In response to the operation to the start key by the user, the execution of the job is started in the image processing device 2.

As described above, in the second preferred embodiment, the annunciation controlling part 33 displays the annunciation image 63 including the redraw button 64 on the display unit 14 at time of start of the display processing of the display screen acquired from the web server 3 by the browser 30. So, even when the display processing of the display screen by the browser 30 is not complete, the user is allowed to give the instruction for another acquisition of the display screen to the browser 30 by own decision. It is assumed that the display error is not detected by the error detecting part 31 at completion of the display processing of the display screen by the browser 30. In this case, the annunciation controlling part 33 changes not to display the annunciation image 63. So, when the annunciation image 63 is not displayed after the display processing of the display screen by the browser 30, the user may know all the contents necessary to make the entry operation are displayed normally. Therefore, the user is allowed to continue the entry operation with the display screen.

The second preferred embodiment besides the display of the annunciation image as explained above is the same as the first preferred embodiment. The operational advantage of the second preferred embodiment besides the display of the annunciation image is the same as that of the first preferred embodiment.

Third Preferred Embodiment

A third preferred embodiment of the present invention is described next. According to the first and second preferred embodiment, when the content necessary for the user to continue the entry operation is not displayed normally, the user makes an operation to the annunciation image 60 or 63 displayed on the display unit 14. So, the user is allowed to cause the browser 30 to again acquire the display screen.

The decision, however, that whether or not to again acquire the display screen is left to the user, so some user may not give the instruction for another acquisition of the display screen. Especially when a heavy load is placed on the web server 3 or the network 4, it is anticipated that it takes a while to again acquire the display screen. So, in such a circumstance, the user may not give the instruction for another acquisition. If the user operates the start key displayed normally on the display screen then, the execution of the job is started in the image processing device 2.

As the content necessary for the user to make the entry operation is not displayed normally, it is possible that the user has not checked each set value for execution of the job. If the execution of the job is started in response to the operation to the start key, the execution of the job may be proceeded in a manner that the user does not satisfy.

In the third preferred embodiment, it is assumed that the start key is operated while the content contained in the display screen acquired from the web server 3 is not displayed normally. In this case, although the display screen is not again acquired from the web server 3, the user is allowed to check the set value of each set item corresponding to the undisplayed content before execution of the job.

Figure 13:
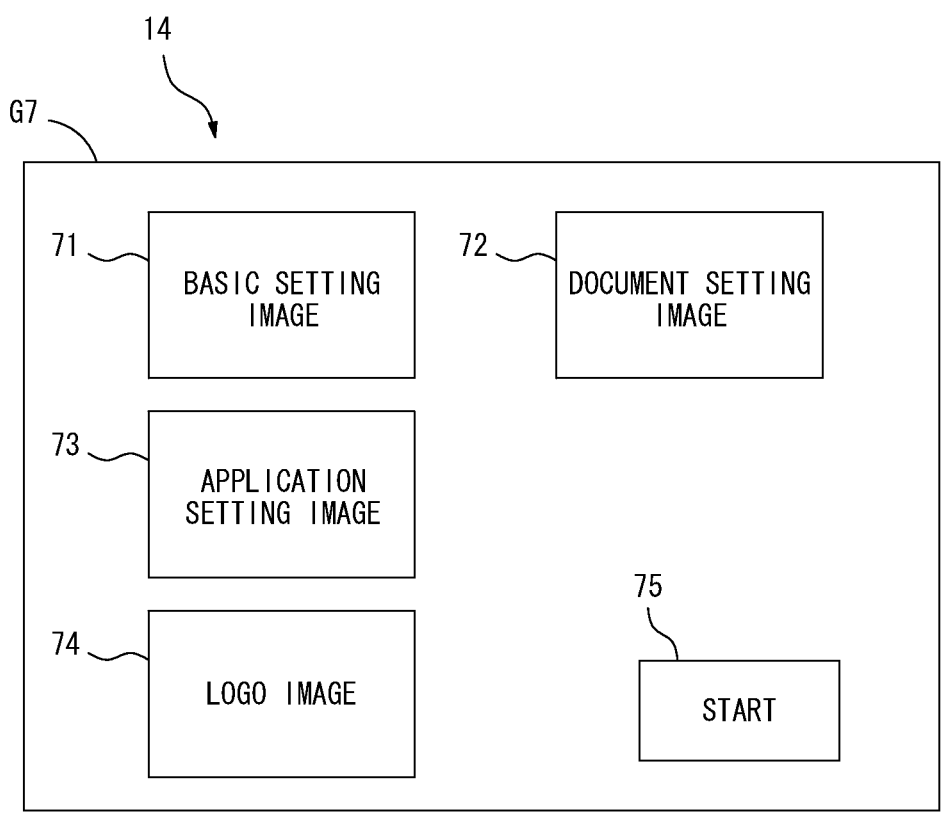
FIG. 13 shows an example of a display screen displayed on the display unit when all contents included in the display screen are received normally by the browser.

FIG. 13 shows an example of a display screen G7 displayed on the display unit 14 by the browser 30. The display screen G7 shows an example of a display when all contents contained in the display screen G7 are received normally. The display screen G7 contains a basic setting image 71, a document setting image 72, an application setting image 73, a logo image 74 and a start key 75 as a content.

The basic setting image 71 is, for example, an bitmap image showing each of at least one set item and the corresponding current set value relating to basic settings for use of the copy function of the image processing device 2. The user sees the details of the display of the basic setting image 71 displayed on the display screen G7, thereby checking each set item and the corresponding current set value relating to the basic settings.

The document setting image 72 is a bitmap image showing each of at least one set item and the corresponding current set value relating to document settings for document reading. The user sees the document setting image 72 displayed on the display screen G7, thereby checking each set item and the corresponding current set value relating to the document settings.

The application setting image 73 is a bitmap image showing each of at least one set item and the corresponding current set value relating to application settings for use of the image processing device 2. The user sees the application setting image 73 displayed on the display screen G7, thereby checking each set item and the corresponding current set value relating to the application settings. The application settings include, for instance, finishing settings for print output.

The logo image 74 is a bitmap image showing a logo mark of a company or the like which provides a service using the web server 3, for example. The logo image 74 does not include information such as the set item and the corresponding current set value, which is different from the basic setting image 71, the document setting image 72 and the application setting image 73.

The start key 75 is also displayed on the display screen G7 as a bitmap image. The start key 75 is an operation key to give the instruction on start of execution of the job to the image processing device 2.

It is assumed a heavy load is placed on the web server or the network 4 when the browser 30 sends the request for screen D10 to the web server 3. In this case, the browser 30 sometimes does not receive normally all the contents required to display the display screen G7 as illustrated in FIG. 13, for example. In such a case, the browser 30 is not capable of laying each content D21 and D22 out normally based on the web page D20 received from the web server 3. So, an incomplete display screen missing some contents is displayed on the display unit 14.

Figure 14:
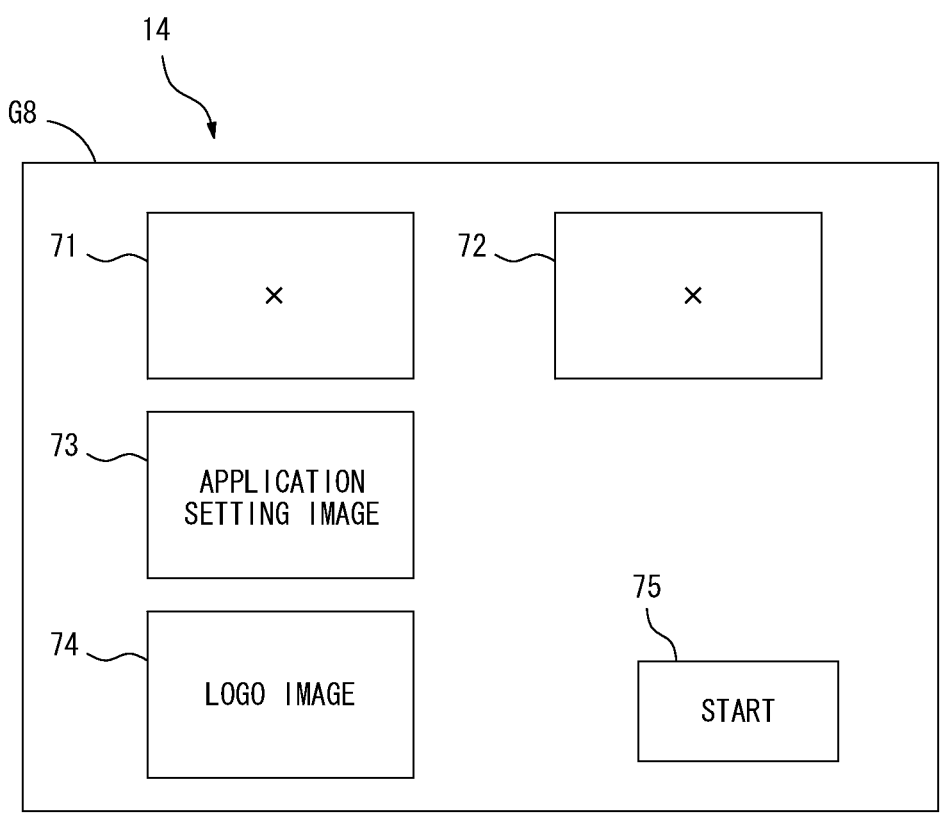
FIG. 14 shows an example of a display screen displayed on the display unit when the contents that include set items and set values of a job are not received normally by the browser.

FIG. 14 shows an example of a display screen G8 displayed on the display unit 14 by the browser 30. The display screen G8 is an example of a display when the basic setting image 71 and the document setting image 72 contained in the display screen G7 of FIG. 13 are not received normally. As the basic setting image 71 and the document setting image 72 are not received normally by the browser 30, a predetermined mark (for example, X mark) is displayed in the respective parts where each image supposed to be displayed on the display screen G8. The user is not able to check the set item and the corresponding current value relating to the basic settings and the document settings with the display. On the other hand, it is possible for the user to give the instruction on execution of the job with making operation to the start key 75.

The user presses the start key 75 in a state that he or she cannot check the set value corresponding to each set item as shown in FIG. 14. In such a case, according to the third preferred embodiment, a setting confirmation screen is displayed on the display unit 14 before execution of the job. The setting confirmation screen is displayed in order to avoid the execution of the job to be started without the set value being checked by the user.

Figure 15:
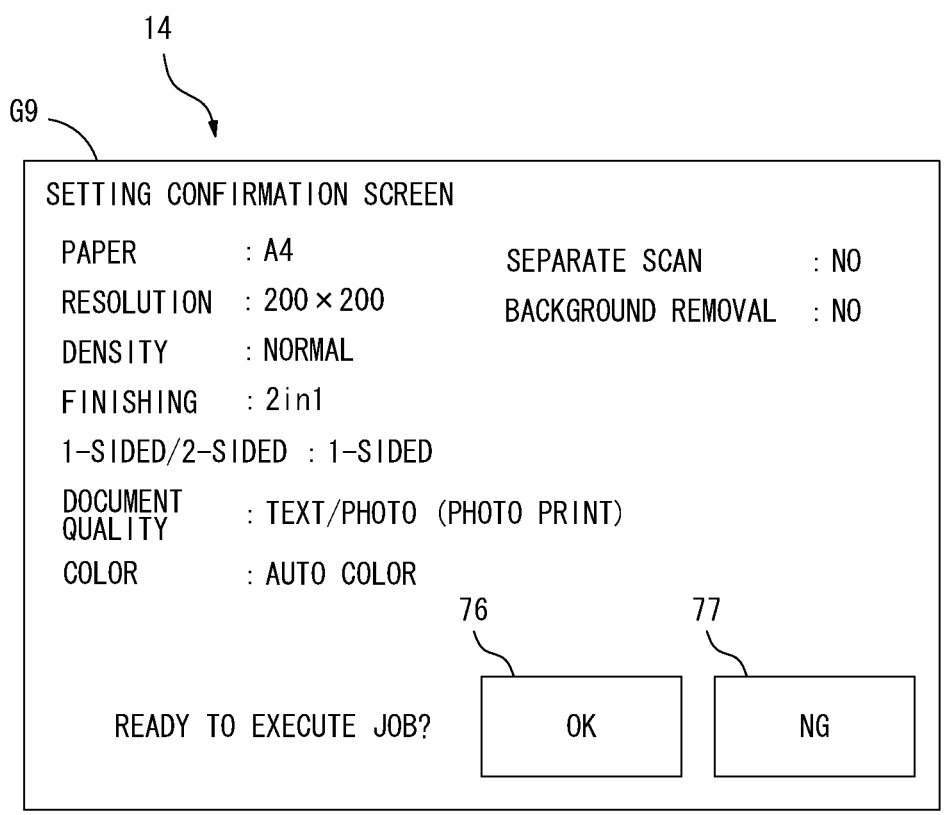
FIG. 15 shows an example of a setting confirmation screen displayed on the display unit before execution of the job.

FIG. 15 shows an example of a setting confirmation screen G9. The setting confirmation screen G9 shows a case where the display screen G8 of FIG. 14 has been displayed on the display unit 14 when the start key 75 is operated by the user. To be more specific, the basic setting image 71 and the document setting image 72 including the content necessary for the user to make the entry operation are not displayed on the display screen G8 as illustrated in FIG. 14. So, the user has not checked the set value corresponding to each set item included in the basic setting image 71 and the document setting image 72 just before making the press operation to the start key 75. In such a case, in response to the press operation to the start key 75, the image processing device 2 creates the setting confirmation screen G9 as shown in FIG. 15 inside and displays on the display unit 14. The set value corresponding to each set item for execution of the job is shown on the setting confirmation screen G9. The user is allowed to check the set value before execution of the job is started in the image processing device 2.

As shown in FIG. 15, the setting confirmation screen G9 includes an OK key 76 and a NG key 77. After checking each set value shown on the setting confirmation screen G9, the user operates the OK key 76 to execute the job. The user operates the NG key to cancel the execution of the job and make another setting operation of the job. More specifically, the OK key 76 is to give an instruction for execution of the job with the setting confirmation screen G9 being displayed. The NG key 77 is for making another setting operation of the job.

In response to the operation to the OK key 76 by the user, the image processing device 2 changes the display screen displayed on the display unit 14 back to the display screen displayed by the browser 30, and starts execution of the job. In response to the operation to the NG key 77 by the user, the image processing device 2 changes the display screen displayed on the display unit 14 back to the display screen displayed by the browser 30, and gives the instruction for another acquisition of the display screen to the browser 30. So, the browser 30 again acquires the display screen currently displayed on the display unit 14 from the web server 3 and displays the acquired display screen on the display unit 14. As the result of another acquisition of the display screen, the image not being displayed may be displayed normally. The browser 30 is ready to again receive the operation to change the set value made by the user.

Figure 16:
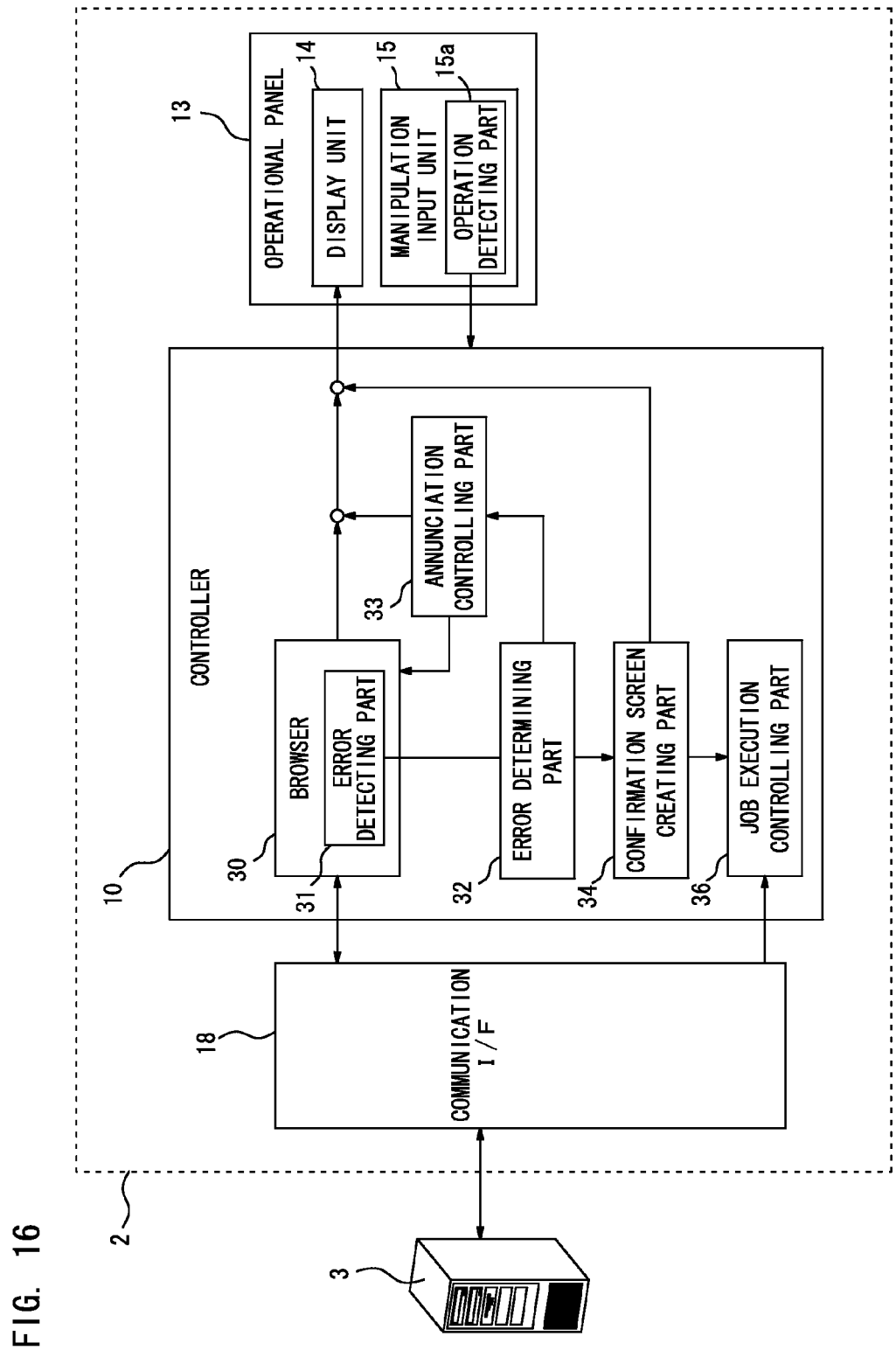
FIG. 16 is a block diagram showing the configuration of functions realized when the controller functions as the display screen control device in the third preferred embodiment.

FIG. 16 is a block diagram showing the configuration of functions realized when the controller 10 functions as the display screen control device according to the third preferred embodiment. As seen from FIG. 16, the controller 10 functions as the browser 30, the error determining part 32, the annunciation controlling part 33, a confirmation screen creating part 34 and the job execution controlling part 36. The browser 30, the error determining part 32, the annunciation controlling part 33 and the job execution controlling part 36 are the same as those of the first and second preferred embodiments. The confirmation screen creating part 34 is unique to the third preferred embodiment. The confirmation screen creating part 34 creates the setting confirmation screen G9 of FIG. 15 and displays on the display unit 14, which is explained in detail below.

In the third preferred embodiment, when the start key 75 is pressed by the user in a state he or she cannot check the set value of each set item as shown in FIG. 14, the error detecting part 31 detects whether or not the display error of the content is occurred. If the display error of the content is occurred, the error determining part 32 executes the error determination. The error determination is the same as that in the first and second preferred embodiments. In the error determination, whether or not the content not displayed on the display unit 14 is necessary for the user to make the entry operation is determined. In the example of the display screen G7 of FIG. 13, the basic setting image 71 and the document setting image 72 and the application setting image 73 are not displayed normally. In such a case, the error determining part 32 determines the content necessary for the user to make the entry operation is not displayed normally.

It is assumed that the error determining part 32 determines that the content necessary for the user to make the entry operation is not displayed normally when the start key 75 is pressed by the user. In this case, the error determining part 32 puts the confirmation screen creating part 34 into operation.

The confirmation screen creating part 34 creates the setting confirmation screen G9 to display the set value corresponding to each set item included in the undisplayed content on the display unit 14 when the start key 75 is pressed by the user. More in detail, the confirmation screen creating part 34 does not acquire the display screen to display on the display unit 14 from the web server 3 as the browser 30 does. The confirmation screen creating part 34 creates the display screen to display on the display unit 14 with internal processing.

As the various types of set value applied for execution of the job in the image processing device 2 are stored in a part such as the storage device 19, for example, the confirmation screen creating part 34 reads the stored set value from the part such as the storage device 19 and creates the setting confirmation screen G9.

In some cases, the set value for execution of the job is managed by the web server 3. In such a case, the confirmation screen creating part 34 acquires the set value from the web server 3 and creates the setting confirmation screen G9. In the third preferred embodiment, data acquired by the confirmation screen creating part 34 from the web server 3 is data representing each set value as simple data row. Therefore, even when a relatively heavy load is placed on the web server 3 or the network 4, relatively steady data acquisition is enabled compared with the acquisition of data such as the web page D20, the contents D21 and D22 as shown in FIG. 4. A rapid data acquisition is also enabled.

After the start key 75 is operated by the user, the confirmation screen creating part 34 is allowed to display the setting confirmation screen G9 on the display unit 14 immediately. The user may check each set value applied to execution of the job efficiently before execution of the job is started in the image processing device 2.

After checking each set value displayed on the setting confirmation screen G9, the user operates the OK key 76 to execute the job. The user operates the NG key 77 to change the set value. In the third preferred embodiment, it enables to prevent successfully the job to be executed without each set value being checked by the user.

Figure 17:
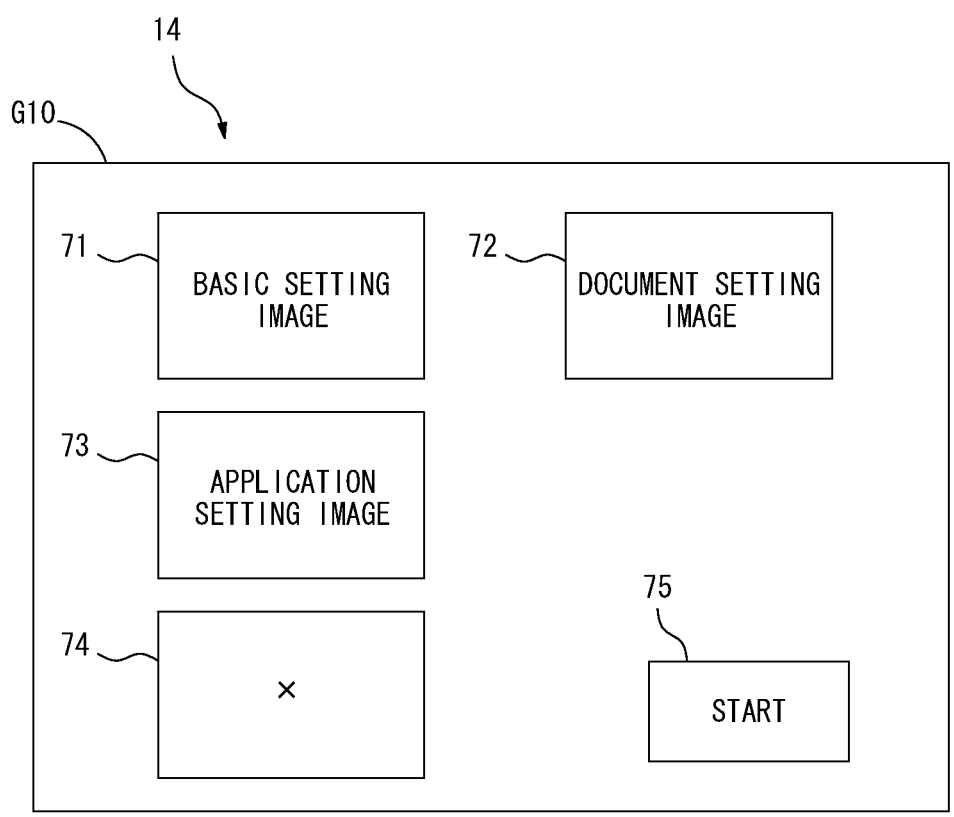
FIG. 17 shows an example of a display screen displayed on the display unit when the content does not include a set item and the corresponding set value of the job is not received normally by the browser.

According to the third preferred embodiment, as the error determining part 32 determines all the contents necessary for the user to make the entry operation are displayed normally when the start key 75 is pressed by the user, the confirmation screen creating part 34 is not put into operation. So, the setting confirmation screen G9 is not displayed on the display unit 14. By way of example, as shown in FIG. 17, when the logo image 74 contained in the display screen G1 is not received normally, the display error is detected by the error detecting part 31. The logo image 74 not being displayed, however, is determined as the unnecessary content to make the entry operation by the error determining part 32. The confirmation screen creating part 34 is not put into operation, and the setting confirmation screen G9 is not created. In this case, the job execution controlling part 36 is put into operation in the image processing device 2 to start the execution of the job in response to the press operation to the start key 75 by the user. As described above, it is assumed that the display error is detected when the start key 75 is pressed. Even in such a case, the setting confirmation screen G9 is not displayed if the set value corresponding to each set item may be checked at time of the press operation to the start key 75. Therefore, the user is not required to select the OK key 76 or the NG key 77, resulting in improvement in operability.

Figure 18:
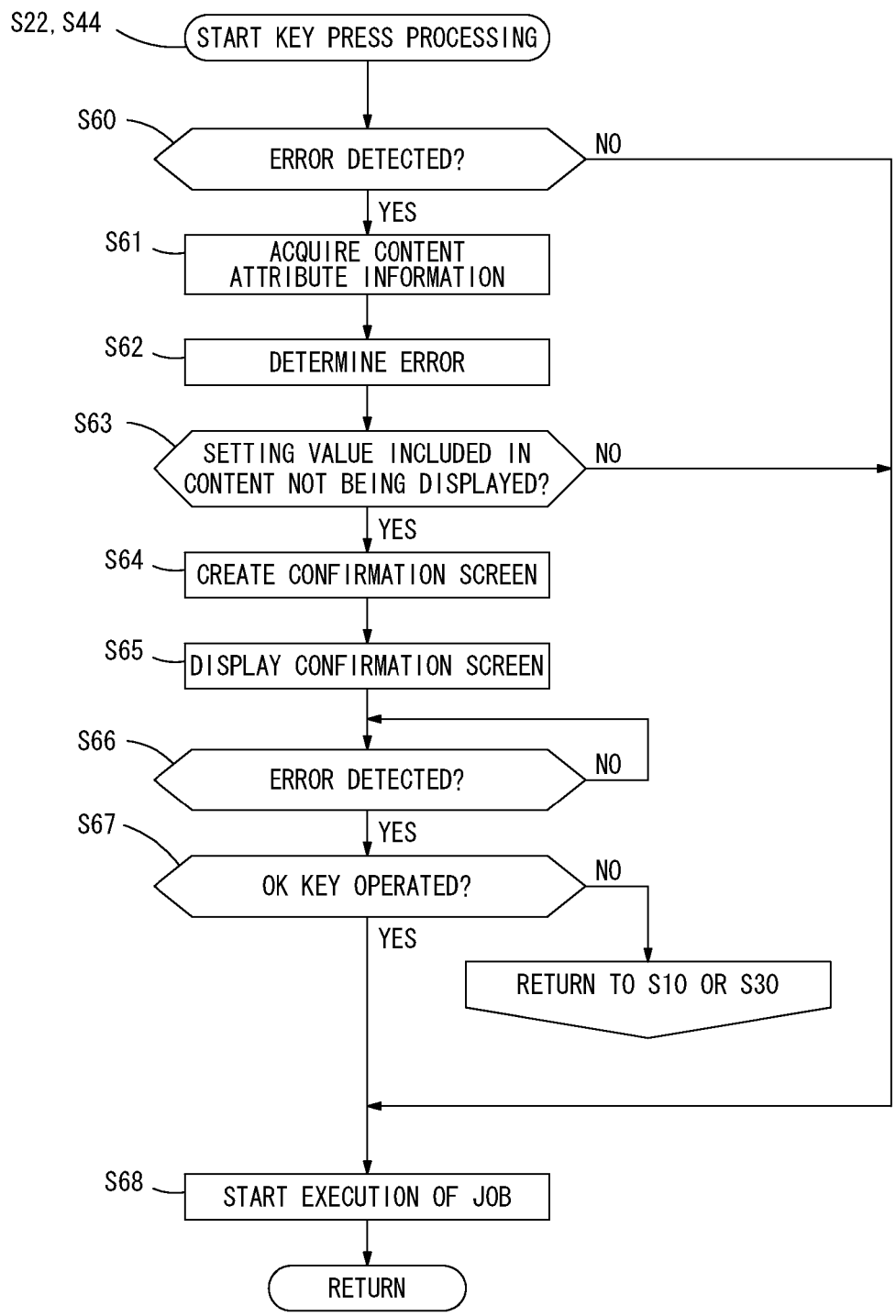
FIG. 18 is a flow diagram explaining the process sequence of a processing executed by the controller when a start key is pressed in the third preferred embodiment.

The detail of operation of the controller 10 of the third preferred embodiment is described next. FIG. 18 is a flow diagram explaining the process sequence of a processing executed by the controller 10. This processing is executed as the detailed process sequence of the start key press processing (step S22 of FIG. 10) explained in the first preferred embodiment or the start key press processing (step S44 of FIG. 12) explained in the second preferred embodiment.

In response to the detection of the press operation to the start key 75 by the user, the controller 10 determines whether or not the display error has been detected by the error detecting part 31 (step S60). When the display error is not detected (when a result of step S60 is NO), the controller 10 proceeds to step S68. The controller 10 starts execution of the job by the job execution controlling part 36, and completes the processing.

When the display error is detected (when a result of step S60 is YES), the error determining part 32 is put into operation to acquire the content attribute information D20a corresponds to the content in which the display error is detected (step S61). The error determining part 32 then executes the error determination based on the content attribute information D20a to determine whether the content necessary for the user to make the entry operation is not displayed (step S62). The error determining part 32 also determines whether or not the set item and the corresponding set value of the job are included in the undisplayed content. As the set item and the corresponding set value of the job are included, the controller 10 moves to step S64. As the set item and the corresponding set value of the job are not included in the undisplayed content, the controller 10 proceeds to step S68. The controller 10 starts execution of the job by the job execution controlling part 36, and completes the processing.

When the set item and the corresponding set value of the job are included in the undisplayed content (when a result of step S63 is YES), the confirmation screen creating part 34 is put into operation. The confirmation screen creating part 34 creates the setting confirmation screen G9 to display on the display unit 14 (step S64) and displays the created setting confirmation screen G9 on the display unit 14 (step S65). As the result, the user is allowed to check in advance each set value applied to execution of the job.

The controller 10 next determines whether or not the operation made by the user is detected (step S66). The controller 10 is put into a waiting state until the operation made by the user is detected. In response to the detection of the operation made by the user (when a result of step S66 is YES), the controller 10 determines whether or not the OK key 76 is operated (step S67). When the OK key 76 is operated (when a result of step S67 is YES), the controller 10 starts the execution of the job by the job execution controlling part 36, and completes the processing (step S68). When the NG key 77 is operated (when a result of step S67 is NO), the controller 10 cancels the execution of the job, and returns to step S10 of FIG. 10 or step S30 of FIG. 12. The controller 10 executes the processing described in the first preferred embodiment or the second preferred embodiment repeatedly to receive the operation to change setting made by the user.

As described above, in the third preferred embodiment, even when some or all of the contents contained in the display screen displayed on the display unit 14 are not displayed normally, the set value included in the undisplayed contents may be checked by the user before execution of the job is started in the image processing device 2. Therefore, the output of the job may be prevented to be generated in a manner that the user does not satisfy. The user is not required to operate repeatedly an update key to redraw the display screen with the function of the browser 30 in order to check the set value included in the undisplayed content. So, the operability is excellent. Specifically, the confirmation screen creating part 34 does not acquire the setting confirmation screen G9 from the web server 3. Even when a heavy load is placed on the web server 3 or the network 4, the confirmation screen creating part 34 is capable of creating the setting confirmation screen G9 efficiently and causing the created screen to be displayed on the display unit 14. Even in case that the content contained in the display screen acquired from the web server 3 is not displayed normally, another acquisition of the display screen from the web server 3 is unnecessary. The user may check easily the set value corresponding to the set item included in the content.

The third preferred embodiment besides the creation of the setting confirmation screen G9 as explained above is the same as the first or the second preferred embodiment. The operational advantage of the third preferred embodiment besides the creation of the setting confirmation screen G9 is the same as the one of the first or second preferred embodiment.

(Modifications)

While the preferred embodiments of the present invention have been described above, the present invention is not limited to these preferred embodiments. Various modifications may be applied to the present invention.

In the preferred embodiments described above, the display screen control device of the present invention is shown to be a device implementing the display screen control device in the image processing device 2 such as an MFP. The device capable of being applied each constituent part as the above-described display screen control device is not necessarily the image processing device 2 such as the MFP. To be more specific, each constituent part as the above-described display screen control device may be applied to a device other than the image processing device. The above-described function may be incorporated in a personal computer (PC) conventionally used. The above-described function may also be incorporated in a mobile terminal such as a mobile phone and a PDA (Personal Digital Assistant). Especially for the mobile terminal, a display size of a display unit is small. In many cases, information such as a tool bar to operate a browser is set not to display. So, improvement in operability may be achieved by displaying the above-described annunciation image.

While the invention has been shown and described in detail, the foregoing description is in all aspects illustrative and not restrictive. It is therefore understood that numerous modifications and variations can be devised without departing from the scope of the invention.

What is claimed is:

1. A display screen control device, comprising:
a display part for displaying various types of information;
an operation detecting part for detecting an entry operation made by a user;
a communicating part for performing data communication with a web server;
a browser for acquiring a display screen available for the user to make the entry operation from said web server via said communicating part and displaying the acquired display screen on said display part;
an error detecting part for detecting whether or not a display error of a content contained in the display screen acquired from said web server by said browser is occurred with the display screen being displayed on said display part;
an error determining part for determining whether or not the content in which the display error is detected is necessary for the user to continue the entry operation when the display error is detected by said error detecting part; and
an annunciation controlling part for controlling display of an annunciation image to alert the user to again acquire the display screen on said display part in case the content in which the display error is detected is necessary for the user to continue the entry operation and controlling not displaying the annunciation image on said display part in case the content in which the display error is detected is not necessary for the user to continue the entry operation based on a result of the determination made by said error determining part.

2. The display screen control device according to claim 1, wherein
said annunciation image includes a message indicating occurrence of the display error on the display screen displayed on said display part by said browser.

3. The display screen control device according to claim 1, wherein
said annunciation controlling part displays said annunciation image on said display part when a display processing of the display screen acquired from said web server by said browser is started, and changes not to display said annunciation image if the display error is not detected by said error detecting part at time of completion of the display processing of the display screen by said browser.

4. The display screen control device according to claim 1, wherein
said annunciation image includes a button to cause said browser to again acquire the display screen from said web server.

5. The display screen control device according to claim 1, wherein
when an operation to said button made by the user is detected by said operation detecting part, said browser acquires the same display screen from said web server via said communicating part and displays on said display part.

6. A display screen control method, comprising the steps of:
(a) acquiring a display screen available for a user to make an entry operation from a web server connected through a network and displaying the acquired display screen on a predetermined display part;
(b) detecting whether or not a display error of a content contained in the display screen acquired from said web server is occurred with the display screen being displayed on said display part;
(c) determining whether or not the content in which the display error is detected is necessary for the user to continue the entry operation when the display error is detected; and
(d) controlling display of an annunciation image to alert the user to again acquire the display screen on said display part in case the content in which the display error is detected is necessary for the user to continue the entry operation and controlling not displaying the annunciation image on said display part in case the content in which the display error is detected is not necessary for the user to continue the entry operation based on a result of said determination.

7. The display screen control method according to claim 6, wherein
said annunciation image includes a message indicating occurrence of the display error on the display screen displayed on said display part in said step (a).

8. The display screen control method according to claim 6, wherein
in said step (d), said annunciation image is displayed on said display part when a display processing of the display screen acquired from said web server in said step (a) is started, and said annunciation image is changed not to be displayed if the display error is not detected in sais step (b) at time of completion of the display processing of the display screen in said step (a).

9. The display screen control method according to claim 6, wherein
a button to cause again acquiring the display screen from said web server in said step (a) is included in said annunciation image.

10. The display screen control method according to claim 6, wherein
in said step (a), when an operation to said button included in said annunciation image made by the user is detected, the same display screen is acquired from said web server and displayed on said display part.

11. A nontransitory computer-readable recording medium on which a program is recorded, said program causing a computer to execute the steps of:
(a) acquiring a display screen available for a user to make an entry operation from a web server connected through a network and displaying the acquired display screen on a predetermined display part;
(b) detecting whether or not a display error of a content contained in the display screen acquired from said web server is occurred with the display screen being displayed on said display part;
(c) determining whether or not the content in which the display error is detected is necessary for the user to continue the entry operation when the display error is detected; and
(d) controlling display of an annunciation image to alert the user to again acquire the display screen on said display part in case the content in which the display error is detected is necessary for the user to continue the entry operation and controlling not displaying annunciation image on said display part in case the content in which the display error is detected is not necessary for the user to continue the entry operation based on a result of said determination.

12. The nontransitory computer readable medium according to claim 11, wherein
said annunciation image includes a message indicating occurrence of the display error on the display screen displayed on said display part in said step (a).

13. The nontransitory computer readable medium according to claim 11, wherein
in said step (d), said annunciation image is displayed on said display part when a display processing of the display screen acquired from said web server in said step (a) is started, and said annunciation image is changed not to be displayed if the display error is not detected in said step (b) at time of completion of the display processing of the display screen in said step (a).

14. The nontransitory computer readable medium according to claim 11, wherein
a button to cause again acquiring the display screen from said web server in said step (a) is included in said annunciation image.

15. The nontransitory computer readable medium according to claim 14, wherein
in said step (a), when an operation to said button included in said annunciation image made by the user is detected, the same display screen is acquired from said web server and displayed on said display part.

* * * * *